(12) United States Patent
Iida et al.

(10) Patent No.: US 8,008,393 B2
(45) Date of Patent: Aug. 30, 2011

(54) AUTOMOBILE WATER-BASED PAINT

(75) Inventors: Tadashi Iida, Nishikamo-gun (JP); Yoshizumi Matsuno, Nishikamo-gun (JP); Yasushi Nakao, Nishikamo-gun (JP)

(73) Assignee: Kansai Paint Co., Ltd., Hyogo-Ken (JP)

( * ) Notice: Subject to any disclaimer, the term of this patent is extended or adjusted under 35 U.S.C. 154(b) by 574 days.

(21) Appl. No.: 12/232,576

(22) Filed: Sep. 19, 2008

(65) Prior Publication Data

US 2009/0075063 A1    Mar. 19, 2009

(30) Foreign Application Priority Data

Sep. 19, 2007 (JP) ................. 2007-242832

(51) Int. Cl.
*C08L 33/00* (2006.01)
(52) U.S. Cl. ........ 524/523; 524/515; 524/522; 524/525; 525/55; 523/206
(58) Field of Classification Search .......... 524/515, 524/517, 522, 523, 525; 525/55; 523/206
See application file for complete search history.

(56) References Cited

U.S. PATENT DOCUMENTS

| | | | |
|---|---|---|---|
| 4,403,003 A | 9/1983 | Backhouse | |
| 4,539,363 A | 9/1985 | Backhouse | |

FOREIGN PATENT DOCUMENTS

| | | |
|---|---|---|
| EP | 0 803 555 | 10/1997 |
| GB | 2 410 953 | 8/2005 |
| JP | 2-97564 | 4/1990 |
| JP | 5-140485 | 6/1993 |
| JP | 2001-104878 | 4/2001 |
| JP | 2001-220544 | 8/2001 |

*Primary Examiner* — David W Wu
*Assistant Examiner* — Vu A Nguyen
(74) *Attorney, Agent, or Firm* — Wenderoth, Lind & Ponack, L.L.P.

(57) ABSTRACT

This invention provides an automobile water-based paint capable of forming coating film of little metallic mottling and excellent flip-flop property and smoothness, which comprises hydroxyl-containing resin, viscosity-regulating agent and hydrophobic solvent, the viscosity-regulating agent being a copolymer obtained by copolymerizing a monomeric mixture containing a (meth)acrylic acid (salt), monomer represented by the following formula (1)

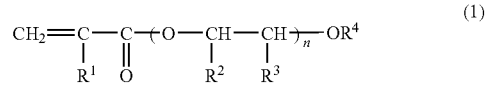

[in which $R^1$ stands for hydrogen or methyl, $R^2$ and $R^3$ stand for hydrogen, methyl or ethyl, $R^4$ stands for $C_{8-24}$ hydrocarbon group, and n is an integer of 3-60], alkyl (meth)acrylate of which alkyl moiety has 1-4 carbons and a monomer having at least two polymerizable unsaturated groups per molecule, at specific ratios.

14 Claims, No Drawings

AUTOMOBILE WATER-BASED PAINT

TECHNICAL FIELD

This invention relates to automobile water-based paint and also to methods for forming coating film using the same.

BACKGROUND ART

Coating of automobile bodies is generally performed by applying an electrodeposition paint as the undercoat, thereafter applying an intermediate coat thereon, and further applying a top coat.

As coating methods, for example, 1-coat-1-bake system comprising applying a single kind of top coat and heat-curing the same; and 2-coat-1-bake system using two kinds of top coat consisting of base coat paint and clear coat paint, which comprises applying first the base coat paint, applying the clear coat paint thereon without curing the former, and heat-curing the two coating films simultaneously; may be named. Of these, in the 2-coat-1-bake system coating, it has been widely practiced to improve appearance of the coating film by using, as the base coat paint, one containing effect pigment such as aluminum flakes, mica or the like.

Effect pigment has sparkling brightness and changes its color tone with change in viewing direction, to exhibit unique decorative effect. This characteristic property of changing color tone according to viewing directions is referred to as flip-flop property, and effect pigment showing greater color tone change has a higher flip-flop property and contributes to superior appearance of the coating film containing the same.

In recent years, on the other hand, promotion of water-based paint is being advanced from the standpoints of environmental preservation and resource saving. Hence, also as to paint containing effect pigment, development of water-based base coat paint capable of forming coating film having excellent brightness is positively promoted.

Whereas, coating film formed of water-based base coat paint is subject to such problems as inferior flip-flop property or smoothness or occasional development of metallic mottling, compared to that formed of organic solvent-based base coat paint.

As a means to solve such problems, for example, JP Hei 2 (1990)-97564A discloses a method of improving flip-flop property of water-based base coat paint by having it contain fine particles of crosslinked polymer, but the problem of easy occurrence of metallic mottling in the formed coating film remains with this method.

Also JP Hei 5 (1993)-140485A discloses a method for inhibiting fat edge, sagging, metallic mottling and the like, by blending into water-based base coat paint montmorillonite and/or an organocomplex thereof in combination with silica powder, as thickener. This method, however, gives rise to a problem of tending to impair smoothness of coated surface presumably originating from deterioration in flow property (levelling property) of the paint.

Furthermore, JP 2001-104878A discloses a method for inhibiting film deficiency such as sagging, unevenness and the like occurring with change in coating conditions, in particular, in humidity, by using an aqueous dispersion obtained by copolymerization of specific long-chain monomers. In this method also the problem exists that degradation in smoothness of coated surface easily takes place, presumably due to deterioration in flow property of the paint.

DISCLOSURE OF THE INVENTION

The object of the present invention is to provide automobile water-based paint which can form coating film of little metallic mottling and excellent flip-flop property and smoothness, and coating film-forming methods using, the same.

We have engaged in concentrative studies with the view to accomplish the above object, to now discover that an automobile water-based paint comprising hydroxyl-containing resin, viscosity-regulating agent having specific structure and hydrophobic solvent can form coating film of little metallic mottling and excellent flip-flop property and smoothness, and come to complete the present invention.

Thus the present invention provides an automobile water-based paint which comprises hydroxyl-containing resin (A), viscosity-regulating agent (B) and hydrophobic solvent (C), characterized in that the viscosity-regulating agent (B) is a copolymer obtained by copolymerizing a mixture of polymerizable unsaturated monomers comprising 1-50 mass % of (meth)acrylic acid (salt) (b-1), 5-60 mass % of polymerizable unsaturated monomer (b-2) represented by the following general formula (1):

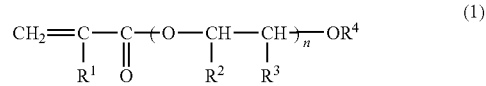

in which
R$^1$ stands for hydrogen or methyl,
R$^2$ and R$^3$ stand for hydrogen, methyl or ethyl,
R$^4$ stands for C$_{8-24}$ hydrocarbon group, and
n is an integer of 3-60, 5-60 mass % of alkyl (meth)acrylate (b-3) of which alkyl moiety has 1-4 carbons, and 0.05-5 mass % of polymerizable unsaturated monomer (b-4) having at least two polymerizable unsaturated groups per molecule, based on the combined mass of the polymerizable unsaturated monomers (b-1)-(b-4).

Use of the automobile water-based paint according to the invention enables to form coating film of little metallic mottling and excellent flip-flop property and smoothness.

Hereinafter the automobile water-based paint according to the present invention and coating methods thereof are explained in further details.

Hydroxyl-Containing Resin (A)

The hydroxyl-containing resin (A) used in the water-based paint of the present invention includes resins having at least one hydroxyl group per molecule, specific examples including such resins as acrylic resin, polyester resin, polyether resin, polycarbonate resin, polyurethane resin, epoxy resin, alkyd resin and the like, which contain hydroxyl group and also acid group such as carboxyl group, where necessary.

The hydroxyl-containing resin (A) preferably has a hydroxyl value within a range of generally 1-200 mgKOH/g, in particular, 2-180 mgKOH/g, inter alia, 5-160 mgKOH/g. Also when the hydroxyl-containing resin (A) contains acid group such as carboxyl group. it preferably has an acid value within a range of generally 1-200 mgKOH/g, in particular, 5-150 mgKOH/g, inter alia, 10-100 mgKOH/g.

As the hydroxyl-containing resin (A), use of at least one kind of resin selected from the group consisting of hydroxyl-containing acrylic resin (A1) and hydroxyl-containing polyester resin (A2) is preferred. In particular, for the purpose of improving smoothness and flip-flop property of the coating film, concurrent use of hydroxyl-containing acrylic resin (A1) and hydroxyl-containing polyester resin (A2) is recommendable. Their ratios in such concurrent use are preferably within a range of 20-80 mass %, in particular, 30-70 mass % of the hydroxyl-containing acrylic resin (A1) and 80-20 mass %. in particular, 70-30 mass % of hydroxyl-containing polyester resin (A2), based on the combined amount of the two.

Hydroxyl-Containing Acrylic Resin (A1)

Hydroxyl-containing acrylic resin (A1) can be prepared by (co)polymerizing a polymerizable unsaturated monomer component including hereafter described hydroxyl-containing polymerizable unsaturated monomer (a1-1) by the means known per se, for example, solution polymerization method in organic solvent, emulsion polymerization method in water, or the like.

Hydroxyl-containing polymerizable unsaturated monomer (a1-1) is a compound having at least one each of hydroxyl group and polymerizable unsaturated bond per molecule, examples of which include monoesters of (meth)acrylic acid with $C_{2-8}$ dihydric alcohols such as 2-hydroxyethyl (meth)acrylate, 2-hydroxypropyl (meth)acrylate, 3-hydroxypropyl (meth)acrylate and 4-hydroxybutyl (meth)acrylate; ε-caprolatone modification products of such monoesters of (meth)acrylic acid with $C_{2-8}$ dihydric alcohols; N-hydroxymethyl (meth)acrylamide; allyl alcohol; and (meth)acrylates having hydroxyl-terminated polyoxyethylene chain. These can be used either alone or in combination of two or more.

Examples of other polymerizable unsaturated monomer which is copolymerizable with above hydroxyl-containing polymerizable unsaturated monomer (a1-1) include: alkyl or cycloalkyl (meth)acrylates such as methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, "Isostearyl Acrylate" (tradename, Osaka Organic Chemical Industry Ltd.), cyclohexyl (meth)acrylate, methylcyclohexyl (meth)acrylate, t-butylcyclohexyl (meth)acrylate, cyclododecyl (meth)acrylate and tricyclodecanyl (meth)acrylate; polymerizable unsaturated monomers having isobornyl group, such as isobornyl (meth)acrylate; polymerizable unsaturated monomers having adamantyl group, such as adamantyl (meth)acrylate; polymerizable unsaturated monomers having tricyclodecanyl group, such as tricyclodecanyl (meth)acrylate; aromatic ring-containing polymerizable unsaturated monomers such as styrene, α-methylstyrene, vinyltoluene and benzyl (meth)acrylate; polymerizable unsaturated monomers having alkoxysilyl group, such as vinyltrimethoxysilane, vinyltriethoxysilane, vinyltris(2-methoxyethoxy)silane, γ-(meth)acryloyloxypropyltrimethoxysilane and γ-(meth)acryloyloxypropyltriethoxysilane; perfluoroalkyl (meth)acrylates such as perfluorobutylethyl (meth)acrylate and perfluorooctylethyl (meth)acrylate; polymerizable unsaturated monomers having fluorinated alkyl group such as fluoroolefin; polymerizable unsaturated monomers having photo-polymerizable functional group like maleimido group; vinyl compounds such as N-vinylpyrrolidone, ethylene, butadiene, chloroprene, vinyl propionate and vinyl acetate; carboxyl-containing polymerizable unsaturated monomers such as (meth)acrylic acid, maleic acid, crotonic acid and β-carboxyethyl acrylate; nitrogen-containing polymerizable unsaturated monomers such as (meth)acrylonitrile, (meth)acrylamide, N,N-dimethylaminoethyl (meth)acrylate, N,N-diethylaminoethyl (meth)acrylate, N,N-dimethylaminopropyl (meth)acrylamide, methylenebis(meth)acrylamide, ethylenebis (meth)acrylamide, dimethylaminoethyl (meth)acrylate, and addition products of glycidyl (meth)acrylate with amines; polymerizable unsaturated monomers having at least two polymerizable unsaturated groups per molecule, such as allyl (meth)acrylate and 1,6-hexanediol di(meth)acrylate; epoxy-containing polymerizable unsaturated monomers such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate and alkylglycidyl ether; (meth)acrylates having alkoxy-terminated polyoxyethylene chain; sulfonic acid group-containing polymerizable unsaturated monomers such as 2-acrylamido-2-methylpropanesulfonic acid, 2-sulfoethyl (meth)acrylate, allylsulfonic acid, 4-styrenesulfonic acid, and sodium salts or ammonium salts of the foregoing; phosphoric acid group-containing polymerizable unsaturated monomers such as 2-acryloyloxyethyl acid phosphate, 2-methacryloyloxyethyl acid phosphate, 2-acryloyloxypropyl acid phosphate, 2-methacryloyloxypropyl acid phosphate, acid phosphoxypolyoxyethylene glycol mono(meth)acrylate and acid phosphoxypolyoxypropylene glycol mono(meth)acrylate; polymerizable unsaturated monomers having UV absorbing functional group, such as 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy)benzophenone, 2,2'-dihydroxy-4-(3-acryloyloxy-2-hydroxypropoxy)benzophenone and 2-(2'-hydroxy-5'-methacryloyloxyethylphenyl)-2H-benzotriazole; UV-stable polymerizable unsaturated monomers such as 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine and 1-crotonoyl-4-crotonoyloxy-2,2,6,6-tetramethylpiperidine; and carbonyl-containing polymerizable unsaturated monomer compounds such as acrolein, diacetonacrylamide, diacetonmethacrylamide, acetoacetoxyethyl methacrylate, formylstyrol and $C_{4-7}$ vinyl alkyl ketones (e.g., vinyl methyl ketone, vinyl ethyl ketone, vinyl butyl ketone). These can be used either alone or in combination of two or more.

In the present specification, "(meth)acrylate" collectively refers to acrylate and methacrylate, "(meth)acrylamide" collectively refers to acrylamide and methacrylamide, "(meth)acrylic acid" collectively refers to acrylic acid and methacrylic acid, and "(meth)acryloyl" collectively refers to acryloyl and methacryloyl.

The hydroxyl-containing acrylic resin (A1) preferably contains amido group. The hydroxyl-containing acrylic resin having amido groups can be prepared by, for example, using as at least a part of other polymerizable unsaturated monomer which is copolymerizable with hydroxyl-containing polymerizable unsaturated monomer (a1-1), amido group-containing polymerizable unsaturated monomer such as (meth)acrylamide, N,N-dimethylaminopropyl (meth)acrylamide, methylenebis(meth)acrylamide, ethylenebis(meth)acrylamide, dimethylaminoethyl (meth)acrylate and the like.

Furthermore, a part of the hydroxyl-containing acrylic resin (A1) may be substituted with "urethane-modified acrylic resin" which is formed by extending polyisocyanate compound at a part of hydroxyl groups in the resin by urethanation reaction to give the resin higher molecular weight.

The use ratio of the hydroxyl-containing polymerizable unsaturated monomer (a1-1) based on the combined amount of the hydroxyl-containing polymerizable unsaturated monomer (a1-1) and other polymerizable unsaturated monomer which is copolymerizable with the monomer (a1-1), can be generally within a range of 1-50 mass %, preferably 2-40 mass %, inter alia, 3-30 mass %.

The hydroxyl-containing acrylic resin (A1) preferably has a hydroxyl value within a range of generally 1-200 mgKOH/g, in particular, 2-150 mgKOH/g, inter alia, 5-100 mgKOH/g, from the viewpoint of water resistance of resulting coating film.

Where the hydroxyl-containing acrylic resin (A1) contains acid groups such as carboxyl group, it preferably has an acid value within a range of generally 1-200 mgKOH/g, in particular 5-150 mgKOH/g, inter alia, 10-100 mgKOH/g, from the viewpoint of storage stability and water resistance of resulting coating film.

The hydroxyl-containing acrylic resin (A1) also preferably has a weight-average molecular weight within a range of generally 3,000-5,000,000, in particular, 4,000-500,000, inter alia, 6,000-200,000, from the viewpoint of smoothness of resulting coating film.

In the present specification "number-average molecular weight" and "weight-average molecular weight" are the values measured with gel permeation chromatographs using tetrahydrofuran as solvent, and converted using polystyrene of known molecular weight as the standard substance.

From the viewpoint of distinctness of image and water resistance of resulting coating film, it is preferred to use, as the hydroxyl-containing acrylic resin (A1), hydroxyl-containing acrylic resin emulsion (A1') having a core/shell type multilayer structure composed of the core of copolymer (I) obtained by copolymerization of 0.1-30 mass % of polymerizable unsaturated monomer (a1-2) having at least two polymerizable unsaturated groups per molecule with 70-99.9 mass % of polymerizable unsaturated monomer (a1-3) having one polymerizable unsaturated group per molecule, and the shell of copolymer (II) obtained by copolymerization of 1-40 mass % of hydroxyl-containing polymerizable unsaturated monomer (a1-1), 5-50 mass % of hydrophobic polymerizable unsaturated monomer (a1-4) and 10-94 mass % of polymerizable unsaturated monomer (a1-5) other than above hydroxyl-containing polymerizable unsaturated monomer (a1-1) and hydrophobic polymerizable unsaturated monomer (a1-4), the solid mass ratio of the copolymer (I)/copolymer (II) being within a range of 10/90-90/10.

Examples of the polymerizable unsaturated monomer (a1-2) having at least two polymerizable unsaturated groups per molecule include allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra(meth)acrylate, glycerol di(meth)acrylate, 1,1,1-trishydroxymethylethane di(meth)acrylate, methylenebis(meth)-acrylamide, ethylenebis(meth)acrylamide, 1,1,1-trishydroxymethylethane tri(meth)acrylate, 1,1,1-trishydroxymethylpropane tri(meth) acrylate, triallyl isocyanurate, diallyl terephthalate, divinylbenzene and the like, which can be used either alone or in combination of two or more.

The use ratio of the polymerizable unsaturated monomer (a1-2) having at least two polymerizable unsaturated groups per molecule preferably is, based on the total mass of the monomer (a1-2) and the polymerizable unsaturated monomer (a1-3) having one polymerizable unsaturated group per molecule, within a range of generally 0.1-30 mass %, in particular, 0.5-10 mass %, inter alia, 1-7 mass %.

In particular, it is desirable for the polymerizable unsaturated monomer (a1-2) having at least two polymerizable unsaturated groups per molecule to contain amido group, for improving flip-flop property and smoothness of resulting coating film and inhibiting metallic mottling. As such polymerizable unsaturated monomer, for example, methylenebis (meth)acrylamide, ethylenebis(meth)-acrylamide and the like can be named.

Where the polymerizable unsaturated monomer (a1-2) having at least two polymerizable unsaturated groups per molecule contains amido group, the use ratio of the monomer conveniently is, based on the total mass of the polymerizable unsaturated monomer (a1-2) and the polymerizable unsaturated monomer (a1-3) having one polymerizable unsaturated group per molecule, within a range of generally 0.1-25 mass %, in particular, 0.5-9 mass %, inter alia, 1-4 mass %.

The polymerizable unsaturated monomer (a1-3) is copolymerizable with the polymerizable unsaturated monomer (a1-2) having at least two polymerizable unsaturated groups per molecule, and includes compounds having one polymerizable unsaturated group such as vinyl group, (meth)acryloyl group or the like per molecule.

Specific examples of the polymerizable unsaturated monomer (a1-3) having one polymerizable unsaturated group per molecule include: alkyl or cycloalkyl (meth)acrylate such as methyl (meth)acrylate, ethyl (meth)acrylate, n-propyl (meth) acrylate, i-propyl (meth)acrylate, n-butyl (meth)acrylate, i-butyl (meth)acrylate, tert-butyl (meth)acrylate, n-hexyl (meth)acrylate, n-octyl (meth)acrylate, 2-ethylhexyl (meth) acrylate, nonyl (meth)acrylate, tridecyl (meth)acrylate, lauryl (meth)acrylate, stearyl (meth)acrylate, "Isostearyl Acrylate" (tradename, Osaka Organic Chemical Industry Ltd.), cyclohexyl (meth)acrylate, methylcyclohexyl (meth)acrylate, t-butylcyclohexyl (meth)acrylate, cyclododecyl (meth)acrylate and tricyclodecanyl (meth)acrylate; polymerizable unsaturated monomers having isobornyl group, such as isobornyl (meth)acrylate; polymerizable unsaturated monomers having adamantyl group, such as adamantyl (meth) acrylate; polymerizable unsaturated monomers having tricyclodecanyl group, such as tricyclodecanyl (meth)acrylate; aromatic ring-containing polymerizable unsaturated monomers such as styrene, α-methylstyrene, vinyltoluene and benzyl (meth)acrylate; polymerizable unsaturated monomers having alkoxysilyl group, such as vinyltrimethoxysilane, vinyltriethoxysilane, vinyltris(2-methoxyethoxy)silane, γ-(meth)acryloyloxypropyltrimethoxysilane and γ-(meth) acryloyloxypropyltriethoxysilane; perfluoroalkyl (meth) acrylates such as perfluorobutylethyl (meth)acrylate and perfluorooctylethyl (meth)acrylate; polymerizable unsaturated monomers having fluorinated alkyl group such as fluoroolefin; polymerizable unsaturated monomers having photo-polymerizable functional group like maleimido group; vinyl compounds such as N-vinylpyrrolidone, ethylene, butadiene, chloroprene, vinyl propionate and vinyl acetate; hydroxyl-containing polymerizable unsaturated monomers such as monoesters of (meth)acrylic acid with $C_{2-8}$ dihydric alcohols such as 2-hydroxyethyl (meth)acrylate, 2-hydroxypropyl (meth)acrylate, 3-hydroxypropyl (meth)acrylate and 4-hydroxybutyl (meth)acrylate, ε-caprolactone-modified monoesters of (meth)acrylic acid with $C_{2-8}$ dihydric alcohols as above, N-hydroxymethyl (meth)acrylamide, allyl alcohol and (meth)acrylate having hydroxyl-terminated polyoxyethylene chain; carboxyl-containing polymerizable unsaturated monomers such as (meth)acrylic acid, maleic acid, crotonic acid and β-carboxyethyl acrylate; nitrogen-containing polymerizable unsaturated monomers such as (meth)acrylonitrile, (meth)acrylamide, N,N-dimethylaminoethyl (meth)acrylate, N,N-diethylaminoethyl (meth)acrylate, N,N-dimethylaminopropyl (meth)acrylamide and addition products of glycidyl (meth)acrylate with amines; epoxy-containing polymerizable unsaturated monomers such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate and alkylglycidyl ether; and (meth)acrylates having alkoxy-terminated polyoxyethylene chain. These can be used either alone or in combination of two or more.

Examples of the hydroxyl-containing polymerizable unsaturated monomer (a1-1) include, as aforesaid, monoesters of (meth)acrylic acid with $C_{2-8}$ dihydric alcohols such as 2-hydroxyethyl (meth)acrylate, 2-hydroxypropyl (meth)acrylate, 3-hydroxypropyl (meth)acrylate and 4-hydroxybutyl (meth)acrylate; ε-caprolatone modification products of such monoesters of (meth)acrylic acid with $C_{2-8}$ dihydric alcohols; N-hydroxymethyl (meth)acrylamide; allyl alcohol, and (meth)acrylates having hydroxyl-terminated polyoxyethylene chain. These can be used either alone or in combination of two or more.

The use ratio of the hydroxyl-containing polymerizable unsaturated monomer (a1-1) is preferably within a range of generally 1-40 mass %, in particular, 4-25 mass %, inter alia, 7-19 mass %, based on the total amount of the monomers (a1-1), (a1-4) and (a1-5).

The hydrophobic polymerizable unsaturated monomer (a1-4) includes polymerizable unsaturated monomers containing linear, branched or cyclic saturated or unsaturated hydrocarbon groups having at least 6 carbon atoms, from which hydrophilic group-containing monomers such as hydroxyl-containing polymerizable unsaturated monomers and the like are excluded. Examples of the monomer (a1-4) include alkyl or cycloalkyl (meth)acrylates such as n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, "Isostearyl Acrylate" (tradename, Osaka Organic Chemical Industry Ltd.), cyclohexyl (meth)acrylate, methylcyclohexyl (meth)acrylate, t-butylcyclohexyl (meth)acrylate, cyclododecyl (meth)acrylate and tricyclodecanyl (meth)acrylate; polymerizable unsaturated monomers having isobornyl group, such as isobornyl (meth)acrylate; polymerizable unsaturated monomers having adamantyl group, such as adamantyl (meth)acrylate; aromatic ring-containing polymerizable unsaturated monomers such as styrene, α-methylstyrene, vinyltoluene and benzyl (meth)acrylate. These can be used either alone or in combination of two or more.

As the hydrophobic polymerizable unsaturated monomer (a1-4), use of polymerizable unsaturated monomer having $C_{6-18}$ alkyl group and/or aromatic ring-containing polymerizable unsaturated monomer is preferred from the viewpoint of distinctness of image of resulting coating film. Use of styrene is still more advantageous.

The use ratio of the hydrophobic polymerizable unsaturated monomer (a1-4) is preferably within a range of generally 5-50 mass %, in particular, 7-40 mass %, inter alia, 9-30 mass %, based on the total amount of the monomers (a1-1), (a1-4) and (a1-5), from the viewpoint of smoothness of resulting coating film.

As the polymerizable unsaturated monomer (a1-5) other than the hydroxyl-containing polymerizable unsaturated monomer (a1-1) and hydrophobic polymerizable unsaturated monomer (a1-4), for example, alkyl (meth)acrylates such as methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate and the like; carboxyl-containing polymerizable unsaturated monomers (a1-6) such as (meth)acrylic acid, maleic acid, crotonic acid, β-carboxyethyl acrylate and the like can be named, which may be used either alone or in combination of two or more.

It is particularly suitable for the polymerizable unsaturated monomer (a1-5), other than the hydroxyl-containing polymerizable unsaturated monomer (a1-1) and hydrophobic polymerizable unsaturated monomer (a1-4), to contain, as at least a part of the same component, above carboxyl-containing polymerizable unsaturated monomer (a1-6), to prevent metallic mottling and give coating film of superior appearance.

As the carboxyl-containing polymerizable unsaturated monomer (a1-6), for example, (meth)acrylic acid, maleic acid, crotonic acid, β-carboxyethyl acrylate and the like can be named, acrylic acid and methacrylic acid being particularly preferred.

The use ratio of the carboxyl-containing polymerizable unsaturated monomer (a1-6) preferably is within a range of generally 1-40 mass %, in particular, 4-25 mass %, inter alia, 7-19 mass %, based on the combined mass of the hydroxyl-containing polymerizable unsaturated monomer (a1-1), hydrophobic polymerizable unsaturated monomer (a1-4) and polymerizable unsaturated monomer (a1-5) other than the monomers (a1-1) and (a1-4), in respect of stability of the hydroxyl-containing acrylic resin emulsion (A1') in the aqueous medium, and appearance and water resistance of resulting coating film.

The hydroxyl-containing acrylic resin emulsion (A1') preferably has a hydroxyl value within a range of generally 1-70 mgKOH/g, in particular, 2-50 mgKOH/g, inter alia, 5-30 mgKOH/g, from the viewpoint of water resistance, flip-flop property and smoothness of resulting coating film.

Where the hydroxyl-containing acrylic resin emulsion (A1') contains acid groups such as carboxyl group, it preferably has an acid value within a range of generally 5-90 mgKOH/g, in particular, 8-50 mgKOH/g, inter alia, 10-35 mgKOH/g, in respect of storage stability or water resistance, flip-flop property and smoothness of resulting coating film.

Also for improving flip-flop property and smoothness of resulting coating film and preventing metallic mottling, preferably polymerizable unsaturated monomers having only one polymerizable unsaturated group per molecule are used as the monomers (a1-1), (a1-4) and (a1-5), to render the shells in the hydroxyl-containing acrylic resin emulsion (A1') uncrosslinked.

The hydroxyl-containing acrylic resin emulsion (A1') can be prepared by emulsion polymerizing a monomeric mixture (I) comprising 0.1-30 mass %, in particular, 0.5-10 mass %, inter alia, 1-7 mass %, of the polymerizable unsaturated monomer (a1-2) having at least two polymerizable unsaturated groups per molecule, and 70-99.9 mass %, in particular, 90-99.5 mass %, inter alia, 93-99 mass %, of the polymerizable unsaturated monomer (a1-3) having one polymerizable unsaturated group per molecule; adding to the resulting emulsion a monomeric mixture comprising 1-40 mass %, in particular, 4-25 mass %, inter alia, 7-19 mass %, of the hydroxyl-containing polymerizable unsaturated monomer (a1-1), 5-50 mass %, in particular, 7-40 mass %, inter alia, 9-30 mass %, of the hydrophobic polymerizable unsaturated monomer (a1-4), and 10-94 mass %, in particular, 35-89 mass %, inter alia, 51-84 mass %, of the polymerizable unsaturated monomer (a1-5) other than the above monomers (a1-1) and (a1-4); and further conducting emulsion polymerization.

Emulsion polymerization of the monomeric mixture (I) can be carried out by any means known per se, for example, using a polymerization initiator in the presence of an emulsifier.

As the emulsifier, anionic or nonionic emulsifiers are suitable. Examples of anionic emulsifier include sodium salts or ammonium salts of such acids as alkylsulfonic acid, alkylbenzenesulfonic acid, alkylphosphoric acid and the like, and examples of nonionic emulsifier include polyoxyethylene oleyl ether, polyoxyethylene stearyl ether, polyoxyethylene lauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate, polyoxyethylene sorbitan monolaurate and the like.

It is also permissible to use polyoxyalkylene group-containing anionic emulsifier containing an anionic group and polyoxyalkylene group such as polyoxyethylene, polyoxypropylene or the like group per molecule, or reactive anionic emulsifier containing the anionic group and radical-polymerizable unsaturated group per molecule. Of these, use of reactive anionic emulsifier is preferred.

Examples of the reactive anionic emulsifier include sodium salts or ammonium salts of sulfonic acid compounds having radical-polymerizable unsaturated groups such as (meth)allyl, (meth)acryloyl, propenyl, butenyl and the like groups. In particular, ammonium salts of radical-polymerizable unsaturated group-containing sulfonic acid compounds are preferred from the viewpoint of water resistance of resulting coating film. As commercially available ammonium salt of such a sulfonic acid compound, for example, LATEMUL S-180A (tradename, Kao Corporation) can be named. Of those ammonium salts of radical-polymerizable unsaturated group-containing sulfonic acid compounds, ammonium salts of sulfonic acid compounds having radical-polymerizable unsaturated group and polyoxyalkylene group are particularly preferred. As a commercially available ammonium salt of sulfonic acid compound having radical-polymerizable unsaturated group and polyoxyalkylene group, for example, AQUALON KH-10 (tradename, Daiichi Kogyo Seiyaku Co., Ltd.) and SR-1025A (tradename, ADEKA Corporation) can be named.

The emulsifier can be used within a range of normally 0.1-15 mass %, preferably 0.5-10 mass %, inter alia, 1-5 mass %, based on the total mass of all of the monomers used.

Examples of the polymerization initiator include organic peroxides such as benzoyl peroxide, octanoyl peroxide, lauroyl peroxide, stearoyl peroxide, cumene hydroperoxide, tert-butyl peroxide, tert-butyl peroxylaurate, tert-butyl peroxyisopropylcarbonate, tert-butyl peroxyacetate, diisopropylbenzene hydroperoxide and the like; azo compounds such as azobisisobutyronitrile, azobis(2,4-dimethylvarelonitrile), azobis(2-methylpropionitrile), azobis(2-methylbutyronitrile), 4,4'-azobis(4-cyanobutanoic acid), dimethylazobis(2-methylpropionate), azobis[2-methyl-N-(2-hydroxyethyl)-propionamide], azobis{2-methyl-N-[2-(1-hydroxybutyl)]-propionamide} and the like; and persulfates such as potassium persulfate, ammonium persulfate, sodium persulfate and the like. These can be used either alone or in combination of two or more. Furthermore, where necessary, such a polymerization initiator may be co-used with reducing agent such as sugar, sodium formaldehyde sulfoxylate, iron complex and the like to form a redox initiator.

The polymerization initiator is preferably used within a range of generally 0.1-5 mass %, in particular, 0.2-3 mass %, based on the total mass of all of the monomers used. Method of adding the polymerization initiator is not particularly limited and can be suitably selected according to its kind and amount. For example, it may be advancedly contained in the monomeric mixture or aqueous medium, or may be added in lump or dropwise at the time of polymerization.

The hydroxyl-containing acrylic resin emulsion (A1') can be obtained by adding to an emulsion containing the copolymer (I) prepared as in the above, a monomeric mixture (II) comprising the hydroxyl-containing polymerizable unsaturated monomer (a 1-1), hydrophobic polymerizable unsaturated monomer (a1-4) and polymerizable unsaturated monomer (a1-5) other than the monomers (a1-1) and (a1-4), and further continuing the polymerization.

The monomeric mixture (II) can suitably contain such polymerization initiator and emulsifier as above, and further such components as chain transfer agent, reducing agent and the like, where necessary.

The monomeric mixture (II) may be dropped as it is, but generally it is desirable to disperse it in an aqueous medium and to drop it in the form of resulting monomeric emulsion. The particle size of the monomeric emulsion in this case is not particularly limited.

As polymerization method of the monomeric mixture (II), for example, an optionally emulsified monomeric mixture (II) is added to the above resin dispersion in lump or dropwise, and heated to a suitable temperature under stirring.

The hydroxyl group-containing acrylic resin emulsion (A1') obtained as above can have a core/shell type multilayer structure in which the copolymer (I) formed from the monomeric mixture (I) comprising polymerizable unsaturated monomer (a1-2) having at least two polymerizable unsaturated groups per molecule and polymerizable unsaturated monomer (a1-3) having one polymerizable unsaturated group per molecule serves as the core, and the copolymer (II) formed from the monomeric mixture (II) comprising the hydroxyl-containing polymerizable unsaturated monomer (a1-1), hydrophobic polymerizable unsaturated monomer (a1-4) and polymerizable unsaturated monomer (a1-5) other than the monomers (a1-1) and (a1-4) serves as the shell.

Suitable ratio of the copolymer (I) to the copolymer (II) in the core/shell type multilayer structure resin lies within a range of, in terms of solid mass ratio of the copolymer (I)/copolymer (II), generally 10/90-90/10, in particular, 50/50-85/15, inter alia, 65/35-80/20, from the viewpoint of flip-flop property and metallic mottling of resulting coating film.

Thus obtained hydroxyl group-containing acrylic resin emulsion (A1') can have an average particle size within a range of generally 10-1,000 nm, in particular, 20-500 nm.

In the present specification, the average particle size of the hydroxyl-containing acrylic resin emulsion (A1') is the value measured with a submicron particle size distribution-measuring device, after dilution with deionized water according to the accepted practice, at 20° C. As the submicron particle size distribution measuring device, for example, COULTER N4 Model (tradename, Beckman Coulter, Inc.) can be used.

In the present invention, it is desirable to neutralize the acidic groups such as carboxyl group in the hydroxyl-containing acrylic resin emulsion (A1') with a neutralizer, for improving mechanical stability of the particles in the emulsion (A1'). The neutralizer is subject to no limitation, so long as it can neutralize acidic groups. Examples of the neutralizer include sodium hydroxide, potassium hydroxide, trimethylamine, 2-(dimethylamino)ethanol, 2-amino-2-methyl-1-propanol, triethylamine, aqueous ammonia and the like. These neutralizers are desirably used in an amount to render pH of the hydroxyl-containing acrylic resin emulsion (A1') after the neutralization around 6.5-9.0.

Hydroxyl-Containing Polyester Resin (A2)

By the use of hydroxyl-containing polyester resin as the hydroxyl-containing resin (A) in the automobile water-based paint of the present invention, smoothness of the resulting coating film can be improved.

Hydroxyl-containing polyester resin (A2) can be usually prepared by esterification reaction or ester-interchange reaction of acid component (a2-1) with alcohol component (a2-2).

As the acid component (a2-1), those compounds customarily used as acid component in production of polyester resins can be used, examples of which include aliphatic polybasic acid (a2-1-1), alicyclic polybasic acid (a2-1-2) and aromatic polybasic acid (a2-1-3).

The aliphatic polybasic acid (a2-1-1) encompasses aliphatic compounds having at least two carboxyl groups per molecule, acid anhydrides of the aliphatic compounds and esters of the aliphatic compounds, for example, aliphatic polyvalent carboxylic acids such as succinic acid, glutaric acid, adipic acid, pimelic acid, suberic acid, azelaic acid, sebacic acid, undecanedioic acid, dodecanedioic acid, brassylic acid, octadecanedioic acid and cytric acid; anhydrides of those aliphatic polyvalent carboxylic acids; and lower alkyl esters of those aliphatic polyvalent carboxylic acids. Those aliphatic polybasic acids (a2-1-1) can be used either alone or in combination of two or more.

From the viewpoint of smoothness of resulting coating film, use of adipic acid and/or adipic anhydride as the aliphatic polybasic acid (a2-1-1) is particularly preferred.

The alicyclic polybasic acid (a2-1-2) encompasses compounds having at least one alicyclic structure (mainly 4- to 6-membered ring) and at least two carboxyl groups per molecule, acid anhydrides of the compounds and esters of the compounds, for example alicyclic polyvalent carboxylic acids such as 1,2-cyclohexanedicarboxylic acid, 1,3-cyclohexanedicarboxylic acid, 1,4-cyclohexanedicarboxylic acid, 4-cyclohexene-1,2-dicarboxylic acid, 3-methyl-1,2-cyclohexanedicarboxylic acid, 4-methyl-1,2-cyclohexanedicarboxylic acid, 1,2,4-cyclohexanetricarboxylic acid and 1,3,5-cyclohexanetricarboxylic acid; anhydrides of the alicyclic polyvalent carboxylic acids; and lower alkyl esters of the alicyclic polyvalent carboxylic acids. Those alicyclic polybasic acids (a2-1-2) can be used either alone or in combination of two or more.

As the alicyclic polybasic acid (a2-1-2), use of 1,2-cyclohexanedicarboxylic acid, 1,2-cyclohexanedicarboxylic anhydride, 1,3-cyclohexanedicarboxylic acid, 1,4-cyclohexanedicarboxylic acid, 4-cyclohexene-1,2-dicarboxylic acid or 4-cyclohexene-1,2-dicarboxylic anhydride is preferred from the viewpoint of smoothness of resulting coating film. Of these, it is particularly preferred to use 1,2-cyclohexanedicarboxylic acid and/or 1,2-cyclohexanedicarboxylic anhydride.

The aromatic polybasic acid (a2-1-3) include aromatic compounds having at least two carboxyl groups per molecule, acid anhydrides of the aromatic compounds and esters of the aromatic compounds, for example, aromatic polyvalent carboxylic acids such as phthalic acid, isophthalic acid, terephthalic acid, naphthalenedicarboxylic acid, 4,4'-biphenyldicarboxylic acid, trimellitic acid and pyromellitic acid; anhydrides of those aromatic polyvalent carboxylic acids; and lower alkyl esters of those aromatic polyvalent carboxylic acids. Above aromatic polybasic acids (a2-1-3) can be used either alone or in combination of two or more.

As the aromatic polybasic acid (a2-1-3), use of phthalic acid, phthalic anhydride, isophthalic acid, trimellitic acid or trimellitic anhydride is preferred.

Acid components (a2-1) other than the above aliphatic polybasic acid (a2-1-1), alicyclic polybasic acid (a2-1-2) and aromatic polybasic acid (a2-1-3) can also be used, without any particular limitation. For example, fatty acids such as coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rape seed oil fatty acid, castor oil fatty acid, dehydrated castor oil fatty acid and safflower oil fatty acid; monocarboxylic acids such as lauric acid, myristic acid, palmitic acid, stearic acid, oleic acid, linoleic acid, linolenic acid, benzoic acid, p-tert-butylbenzoic acid, cyclohexanoic acid and 10-phenyloctadecanoic acid; and hydroxycarboxylic acids such as lactic acid, 3-hydroxybutanoic acid and 3-hydroxy-4-ethoxybenzoic acid can be used. These acid components (a2-1) can be used either alone or in combination of two or more.

As the alcohol component (a2-2), polyhydric alcohol having at least two hydroxyl groups per molecule can be conveniently used, examples of which include dihydric alcohols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentyl glycol, 1,4-cyclohexanedimethanol, tricyclodecanedimethanol, hydrogenated bisphenol A and hydrogenated bisphenol F; polylactonediols formed by adding lactones such as ε-caprolactone to these dihydric alcohols; ester diols such as bis(hydroxyethyl)terephthalate; polyether diols such as alkylene oxide adduct of bisphenol A, polyethylene glycol, polypropylene glycol and polybutylene glycol; tri- or higher-hydric alcohols such as glycerin, trimethylolethane, trimethylolpropane, diglycerin, triglycerine, 1,2,6-hexanetriol, pentaerythritol, dipentaerythritol, tris(2-hydroxyethyl)isocyanuric acid, sorbitol and mannitol; and polylactonepolyols formed by adding lactones such as ε-caprolactone to these tri- or higher-hydric alcohols.

Alcohol component (a2-2) other than the above polyhydric alcohols include, for example, monoalcohols such as methanol, ethanol, propyl alcohol, butyl alcohol, stearyl alcohol and 2-phenoxyethanol; and alcoholic compounds obtained by reaction of monoepoxy compounds such as propylene oxide, butylene oxide, CARDURA E10 (tradename, HEXION Specialty Chemicals Co., a glycidyl ester of synthetic highly branched saturated fatty acid) with acids.

Production method of hydroxyl-containing polyester resin (A2) is not critical, but conventional methods can be used, for example, by heating the above-described acid component (a2-1) and alcohol component (a2-2) in gaseous nitrogen current, at temperatures ranging 150-250° C. for 5-10 hours to carry out an esterification reaction or ester-interchange reaction of the acid component (a2-1) with the alcohol component (a2-2).

In the occasion of the esterification or ester-interchange reaction of the acid component (a2-1) with the alcohol component (a2-2), they may be added all at once, or added as divided portions plural times. After synthesizing a hydroxyl-containing polyester resin first, the resulting hydroxyl-containing polyester resin may be reacted with an acid anhydride to be half-esterified, whereby forming a carboxyl- and hydroxyl-containing polyester resin. Again, a carboxyl-containing polyester resin may be synthesized first, to which then above alcohol component (a2-2) is added to provide a hydroxyl-containing polyester resin.

In the occasion of the esterification or ester-interchange reaction, per se known catalyst such as dibutyltin oxide, antimony trioxide, zinc acetate, manganese acetate, cobalt acetate, calcium acetate, lead acetate, tetrabutyl titanate, tetraisopropyl titanate and the like may be used for promoting the reaction.

The hydroxyl-containing polyester resin (A2) may also be modified, during preparation of the resin, or after the esterification reaction or ester-interchange reaction, with fatty acid, monoepoxy compound, polyisocyanate compound or the like.

As the fatty acid, for example, coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rape seed oil fatty acid, castor oil fatty acid, dehydrated castor oil fatty acid and safflower oil fatty acid can be named; as the monoepoxy compound, for example, CARDURA E10 (tradename, HEXION Specialty Chemicals Co., a glycidyl ester of synthetic highly branched saturated fatty acid) can be favorably used.

As the polyisocyanate compound, for example, aliphatic diisocyanates such as lysine diisocyanate, hexamethylene diisocyanate and trimethylhexane diisocyanate; alicyclic diisocyanates such as hydrogenated xylylene diisocyanate, isophorone diisocyanate, methylcyclohexane-2,4-diisocyanate, methylcyclohexane-2,6-diisocyanate, 4,4'-methylenebis-(cyclohexylisocyanate) and 1,3-(isocyanatomethyl)cyclohexane; aromatic diisocyanates such as tolylene diisocyanate, xylylene diisocyanate and diphenylmethane diisocyanate; organic polyisocyanates themselves such as tri- or higher-valent polyisocyanates like lysine triisocyanate, or adducts of each of these organic polyisocyanates with polyhydric alcohol, low molecular weight polyester resin, water or the like, or mutually cyclized polymers of these organic diisocyanates (e.g., isocyanurates) and biuret type adducts can be named. These can be used either alone or in combination of two or more.

In the hydroxyl-containing polyester resin (A2), preferably the content of alicyclic polybasic acid (a2-1-2) in the starting acid component (a2-1) lies within a range of generally 30-100 mol %, in particular, 35-95 mol %, inter alia, 40-90 mol %, based on the total amount of the acid component (a2-1), from the viewpoint of smoothness and water resistance of resulting coating film. Particularly for smoothness of the coating film, 1,2-cyclohexanedicarboxylic acid and/or 1,2-cyclohexanedicarboxylic anhydride are preferred as the alicyclic polybasic acid (a2-1-2).

The hydroxyl-containing polyester resin (A2) preferably has a hydroxyl value within a range of generally 10-200 mgKOH/g, in particular, 30-180 mgKOH/g, inter alia, 50-160 mgKOH/g. Where the hydroxyl-containing polyester resin (A2) has also carboxyl groups, it preferably has an acid value within a range of generally 5-150 mgKOH/g, in particular, 10-100 mgKOH/g, inter alia, 15-80 mgKOH/g. Furthermore, the hydroxyl-containing polyester resin (A2) preferably has a weight-average molecular weight within a range of generally 500-50,000, in particular, 1,000-30,000, inter alia, 1,200-10,000.

Viscosity-Regulating Agent (B)

The viscosity-regulating agent (B) is a copolymer obtained by copolymerizing a mixture of polymerizable unsaturated monomers comprising 1-50 mass % of (meth)acrylic acid (salt) (b-1), 5-60 mass % of polymerizable unsaturated monomer (b-2) represented by the following general formula (I):

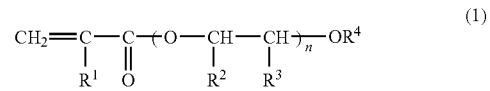

in which
R$^1$ stands for hydrogen or methyl,
R$^2$ and R$^3$ stand for hydrogen, methyl or ethyl,
R$^4$ stands for C$_{8-24}$ hydrocarbon group, and
n is an integer of 3-60,
5-60 mass % of alkyl (meth)acrylate (b-3) of which alkyl moiety has 1-4 carbons, and 0.05-5 mass % of polymerizable unsaturated monomer (b-4) having at least two polymerizable unsaturated groups per molecule, based on the combined mass of the polymerizable unsaturated monomers (b-1)-(b-4).

(Meth)acrylic Acid (Salt) (b-1)

(Meth)acrylic acid (salt) (b-1) include acrylic acid, methacrylic acid, acrylic acid salts or methacrylic acid salts.

The salts of acrylic acid or methacrylic acid include alkali metal salts such as sodium salts, potassium salts, lithium salts and the like; alkaline earth metal salts such as magnesium salts, calcium salts and the like; ammonium salts; mono-, di- or tri-alkanolamine salts such as monoethanolamine salts, diethanolamine salts, triethanolamine salts and the like; and C$_{1-4}$ alkylamine salts such as methylamine salts, ethylamine salts, propylamine salts, butylamine salts and the like.

As the (meth)acrylic acid (salt) (b-1), acrylic acid, methacrylic acid and ammonium salts of methacrylic acid, in particular, acrylic acid and methacrylic acid, inter alia, methacrylic acid, are preferred.

Polymerizable Unsaturated Monomer (b-2)

Polymerizable unsaturated monomer (b-2) is a polymerizable unsaturated monomer which is represented by the following general formula (1):

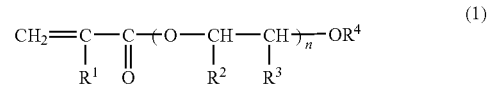

in which
R$^1$ stands for hydrogen atom or methyl,
R$^2$ and R$^3$ stand for hydrogen, methyl or ethyl,
R$^4$ stands for C$_{8-24}$ hydrocarbon group, and
n is an integer of 3-60.

Referring to the above formula (I), R$^2$ and R$^3$ preferably are hydrogen or methyl, in particular, hydrogen, independently of each other, from the viewpoint of smoothness of resulting coating film. R$^4$ preferably is one of C$_{8-24}$ alkyl groups including, for example, straight chain alkyl, branched alkyl, straight chain alkenyl, branched alkenyl and the like groups. Examples of the straight chain alkyl group include n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-heneicosyl, n-docosyl and the like. Examples of branched alkyl group include 2-ethylhexyl, isodecyl, isotridecyl, isostearyl and the like. Also examples of straight chain alkenyl group include n-octenyl, n-decenyl, n-undecenyl, n-dodecenyl, n-tridecenyl, n-tetradecenyl, n-pentadecenyl, n-hexadecenyl, n-heptadecenyl, n-octadecenyl and the like; and examples of branched alkenyl group include isooctenyl, isodecenyl, isoundecenyl, indodecenyl, isotridecenyl, isotetradecenyl, isopentadecenyl, isohexadecenyl, isoheptadecenyl, isooctadecenyl and the like.

For smoothness of resulting coating film, $R^4$ is preferably a straight chain alkyl or straight chain alkenyl, in particular, straight chain alkyl, inter alia, a straight chain alkyl selected from the group consisting of n-hexadecyl, n-heptadecyl, n-octadecyl, n-nonadecyl, n-eicosyl, n-heneicosyl and n-docosyl.

In the above formula (1), n is an integer of 30-60. For smoothness of resulting coating film, n is preferably an integer of 10-50, in particular, 20-40.

Examples of the polymerizable unsaturated monomer (b-2) include (meth)acrylates of n-docosanol-ethylene oxide (3-60 mols) adduct, (meth)acrylates of n-heneicosanoyl-ethylene oxide (3-60 mols) adduct, (meth)acrylates of n-eicosanol-ethylene oxide (3-60 mols) adduct, (meth)acrylates of n-nonadecanol-ethylene oxide (3-60 mols) adduct, (meth)acrylates of n-octadecanol-ethylene oxide (3-60 mols) adduct, (meth)acrylates of n-heptadecanol-ethylene oxide (3-60 mols) adduct, and (meth)acrylates of n-hexadecanol-ethylene oxide (3-60 mols) adduct. Of these, (meth)acrylates of n-docosanol-ethylene oxide (3-60 mols) adduct, (meth)acrylates of n-octadecanol-ethylene oxide (3-60 mols) adduct and (meth)acrylates of n-hexadecanol-ethylene oxide (3-60 mols) adduct are preferred. In particular, (meth)acrylates of n-docosanol-ethylene oxide (3-60 mols) adduct and (meth)acrylates of n-octadecanol-ethylene oxide (3-60 mols) adduct can be conveniently used.

Alkyl (meth)acrylates (b-3) Having $C_{1-4}$ alkyl Moiety Group

Examples of alkyl (meth)acrylates having $C_{1-4}$ alkyl moiety group (b-3) include methyl (meth)acrylate, ethyl (meth)acrylate, n-propyl (meth)acrylate, iso-propyl (meth)acrylate, n-butyl (meth)acrylate, iso-butyl (meth)acrylate and tert-butyl (meth)acrylate. Of these, from the viewpoint of smoothness of resulting coating film, methyl (meth)acrylate, ethyl (meth)acrylate, n-propyl (meth)acrylate and n-butyl (meth)acrylate are preferred. In particular, methyl (meth)acrylate, ethyl (meth)acrylate and n-propyl (meth)acrylate can be conveniently used.

Polymerizable Unsaturated Monomer (b-4) Having at Least Two Polymerizable Unsaturated Groups Per Molecule Polymerizable unsaturated monomer (b-4) is subject to no particular limitation, so long as it is a polymerizable unsaturated monomer copolymerizable with above-described (meth)acrylic acid (salt) (b-1), polymerizable unsaturated monomer (b-2) and alkyl (meth)acrylate (b-3), and has at least two polymerizable unsaturated groups per molecule. For example, bifunctional polymerizable unsaturated monomer (b-4-1) having two polymerizable unsaturated groups per molecule, trifunctional polymerizable unsaturated monomer (b-4-2) having three polymerizable unsaturated groups per molecule, tetra- to octa-functional polymerizable unsaturated monomer (b-4-3) having four to eight polymerizable unsaturated groups per molecule, and the like can be used.

Bifunctional Polymerizable Unsaturated Monomer (b-4-1)

As bifunctional polymerizable unsaturated monomer (b-4-1), for example, di(meth)acrylates of polyols, di(meth)acrylates of polyol-alkylene oxide adducts and the like can be used.

Examples of the polyol include ethylene glycol, propylene glycol, 1,2-butanediol, 1,4-butanediol, 2,3-butanediol, 1,6-hexanediol, 1,9-nonanediol, neopentyl glycol, 3-methyl-1,5-pentanediol, 2-butyl-2-ethyl-1,3-diol, tricyclodecanedimethylol, cyclohexanediol, cyclohexanedimethylol, hydroquinone, bisphenol A, bisphenol F, hydrogenated bisphenol A, hydrogenated bisphenol F, pentaerythritol, trimethylolpropane and glycerin. Of these, 1,4-butanediol, 1,6-hexanediol, 1,9-nonanediol, neopentyl glycol, 3-methyl-1,5-pentanediol, 2-butyl-2-ethyl-1,3-diol, tricyclodecanedimethylol, cyclohexanediol, cyclohexanedimethylol, hydrogenated bisphenol A, hydrogenated bisphenol F, pentaerythritol, trimethylolpropane and glycerin can be conveniently used.

The polyol-alkylene oxide adducts include alkylene oxide adducts of above-named polyols, and the mol number of added alkylene oxide per mol of polyol is preferably within a range of normally 2-100 mols, in particular, 4-80 mols, inter alia, 6-60 mols.

As the alkylene oxide, $C_{2-4}$ alkylene oxides can be conveniently used, examples of which include ethylene oxide, propylene oxide, butylene oxide, tetrahydrofuran and the like. In particular, use of ethylene oxide is preferred.

Those alkylene oxides can be used either alone or in combination of two or more. When two or more kinds of alkylene oxides are used in combination, their arrangement order may be any of blocked, random or mixture of the two. Where two or more alkylene oxides are used, ethylene oxide is preferably contained as a part. More specifically, the ethylene oxide content is preferably within a range of normally 30-99.9 mol %, in particular, 50-99.9 mol %, inter alia, 70-99.9 mol %, based on the total amount of the alkylene oxides.

Trifunctional Polymerizable Unsaturated Monomer (b-4-2)

As trifunctional polymerizable unsaturated monomer (b-4-2), for example, tri(meth)acrylates of polyols having at least three hydroxyl groups per molecule, tri(meth)acrylates of polyol-alkylene oxide adducts and the like can be used.

As such polyols having at least three hydroxyl groups per molecule, for example, pentaerythritol, trimethylolpropane, glycerin, dipentaerythritol, tripentaerythritol, diglycerin, triglycerin, ditrimethylolpropane, tristrimethylolpropane, cyclohexanetetraol and the like can be used.

The mol number of added alkylene oxide in the tri(meth)acrylate of the polyol-alkylene oxide adducts preferably is within a range of normally 3-200 mols, in particular, 6-150 mols, inter alia, 9-100 mols, per mol of the polyol.

As the alkylene oxide, $C_{2-4}$ alkylene oxides can be conveniently used, examples of which include ethylene oxide, propylene oxide, butylene oxide, tetrahydrofuran and the like. In particular, use of ethylene oxide is preferred.

Those alkylene oxides can be used either alone or in combination of two or more. When two or more kinds of alkylene oxides are used in combination, their arrangement order may be any of blocked, random or mixture of the two. Where two or more alkylene oxides are used, ethylene oxide is preferably contained as a part. More specifically, the ethylene oxide content is preferably within a range of normally 30-99.9 mol %, in particular, 50-99.9 mol %, inter alia, 70-99.9 mol %, based on the total amount of the alkylene oxides.

Tetra- to Octa-Functional Polymerizable Unsaturated Monomer (b-4-3)

As tetra- to octa-functional polymerizable unsaturated monomer (b-4-3), for example, tetra(meth)acrylate, penta(meth)acrylate, hexa(meth)acrylate, hepta(meth)acrylate and octa(meth)acrylate of polyols having at least four hydroxyl groups per molecule; and tetra(meth)acrylate, penta(meth)acrylate, hexa(meth)acrylate, hepta(meth)acrylate and octa(meth)acrylate of polyol-alkylene oxide adducts; and the like can be used.

Examples of polyol having at least four hydroxyl groups per molecule include pentaerythritol, dipentaerythritol, tripentaerythritol, tetrapentaerythritol, hexapentaerythritol, diglycerin, triglycerin, ditrimethylolpropane, tristrimethylolpropane, cyclohexanetetraol and sorbitan.

Also the added mol number of alkylene oxide in tetra(meth)acrylate, penta(meth)acrylate, hexa(meth)acrylate, hepta(meth)acrylate and octa(meth)acrylate of polyol-alkylene oxide adducts preferably is within a range of normally 3-200 mols, in particular, 6-150 mols, inter alia, 9-100 mols, per mol of the polyol.

As the alkylene oxide, $C_{2-4}$ alkylene oxides can be conveniently used, examples of which include ethylene oxide, propylene oxide, butylene oxide, tetrahydrofuran and the like. In particular, use of ethylene oxide is preferred.

Those alkylene oxides can be used either alone or in combination of two or more. When two or more kinds of alkylene oxides are used in combination, their arrangement order may be any of blocked, random or mixture of the two. Where two or more alkylene oxides are used, ethylene oxide is preferably contained as a part. More specifically, the ethylene oxide content is preferably within a range of normally 30-99.9 mol %, in particular, 50-99.9 mol %, inter alia, 70-99.9 mol %, based on the total amount of the alkylene oxides.

As the polymerizable unsaturated monomer (b-4), use of those bifunctional polymerizable unsaturated monomers (b-4-1) and/or trifunctional polymerizable unsaturated monomers (b-4-2) is preferred, from the viewpoint of finished appearance. In particular, use of polyoxyalkylene glycol di(meth)acrylate, tri(meth)acrylate of glycerin-alkylene oxide adduct, tri(meth)acrylate of trimethylolpropane-alkylene oxide adduct and tri(meth)acrylate of pentaerythritol-alkylene oxide adduct is preferred, among which polyoxyalkylene glycol di(meth)acrylate and tri(meth)acrylate of glycerin-alkylene oxide adduct, inter alia, polyoxyalkylene glycol di(meth)acrylate, are preferred.

Other Polymerizable Unsaturated Monomer (b-5)

Those polymerizable unsaturated monomers constituting the copolymer serving as the viscosity-regulating agent (B) can include, besides above-described polymerizable unsaturated monomers (b-1)-(b-4), still other polymerizabable unsaturated monomer (b-5).

Such other polymerizable unsaturated monomer (b-5) is subject to no particular limitation, so long as it is copolymerizable with the polymerizable unsaturated monomers (b-1) to (b-4). Whereas, from the viewpoint of smoothness of resulting coating film, ethylenically unsaturated carboxylic acid (salt), polyoxyalkylene (mol number of added alkylene oxide, 2-100) (meth)acrylic acid monoester, alkoxy polyalkylene glycol (mol number of added alkylene oxide, 2-100) (meth)acrylic acid ester, hydroxyalkyl (meth)acrylate, amido group-containing polymerizable unsaturated monomer and the like are preferred. In particular, crotonic acid, isocrotonic acid, itaconic acid, maleic acid, maleic anhydride, fumaric acid, polyoxyethylene (added mol number of ethylene oxide 2-100) mono(meth)acrylates, (meth)acrylates of $C_{1-6}$ aliphatic alcohol-ethylene oxide adducts (added mol number of ethylene oxide 2-100), hydroxymethyl (meth)acrylate, 2-hydroxyethyl (meth)acrylate, dihydroxyethyl (meth)acrylate and (meth)acrylamide; inter alia, maleic acid, fumaric acid, polyoxyethylene (added mol number of ethylene oxide 2-100) mono(meth)acrylates, 2-hydroxyethyl (meth)acrylate, dihydroxyethyl (meth)acrylate and (meth)acrylamide; can be favorably used.

Above polymerizable unsaturated monomers (b-1)-(b-5) can be used either alone or in combination of two or more.

The viscosity-regulating agent (b) used in the automobile water-based paint of the present invention is obtainable by copolymerizing a mixture of polymerizable unsaturated monomers comprising above-described polymerizable unsaturated monomers (b-1)-(b-4) and optionally also polymerizable unsaturated monomer (b-5). The use ratios of the polymerizable unsaturated monomers (b-1)-(b-4) in the copolymerization can be within the following ranges, based on the total mass of the polymerizable unsaturated monomers (b-1) to (b-4):

(meth)acrylic acid (salt) (b-1):
generally 1-50 mass %, preferably 1-45 mass %, inter alia, 7-40 mass %;
polymerizable unsaturated monomer (b-2):
generally 5-60 mass %, preferably 10-55 mass %, inter alia, 20-50 mass %;
alkyl (meth)acrylate having $C_{1-4}$ alkyl group moiety (b-3):
generally 5-60 mass %, preferably 7-50 mass %, inter alia, 10-40 mass %;
polymerizable unsaturated monomer having at least two polymerizable unsaturated groups per molecule (b-4):
generally 0.05-5 mass %, preferably 0.07-4 mass %, inter alia, 0.1-3 mass %.

Where the viscosity-regulating agent (B) contains other polymerizable unsaturated monomer (b-5) as a constituent unit, preferably the use ratio of the other polymerizable unsaturated monomer(s) (b-5) is generally 1-100 mass parts, preferably 5-70 mass parts, inter alia, 10-40 mass parts, per 100 mass parts of the total mass of the polymerizable unsaturated monomers (b-1)-(b-4).

When the blend ratios of the polymerizable unsaturated monomers (b-1)-(b-5) fall within the above ranges, finished appearance becomes even more favorable.

Copolymerization of the polymerizable unsaturated monomers (b-1)-(b-5) can be carried out by per se known methods such as emulsion polymerization, solution polymerization, suspension polymerization, block polymerization and the like, (for example, as described in JP 2004-27208A). Of these, emulsion polymerization and solution polymerization, in particular, solution polymerization, are preferred.

Hydrophobic Solvent (C)

Hydrophobic solvent (C) used in the automobile water-based paint of the present invention is an organic solvent whose mass soluble in 100 g of 20° C. water is not more than 10 g, preferably not more than 5 g, inter alia, not more than 1 g. Examples of such solvent include hydrocarbon solvents such as rubber gasoline, mineral spirit, toluol, xylol and solvent naphtha; alcohol solvents such as n-hexanol, n-octanol, 2-octanol, 2-ethylhexanol, n-decanol, benzyl alcohol, ethylene glycol mono 2-ethylhexyl ether, propylene glycol mono n-butyl ether, dipropylene glycol mono n-butyl ether, tripropylene glycol mono n-butyl ether, propylene glycol mono 2-ethylhexyl ether and propylene glycol mono phenyl ether; ester solvents such as n-butyl acetate, isobutyl acetate, isoamyl acetate, methylamyl acetate and ethylene glycol monobutyl ether acetate; and ketone solvents such as methyl isobutyl ketone, cyclohexanone, ethyl n-amyl ketone and diisobutyl ketone. These can be used either alone or in combination of two or more.

Of those, from the viewpoint of flip-flop property and metallic mottling of resulting coating film, use of an alcohol hydrophobic solvent, in particular $C_{7-14}$ alcohol hydrophobic solvent, inter alia, at least one alcohol hydrophobic solvent selected from the group consisting of n-octanol, 2-octanol, 2-ethyl-1-hexanol, ethylene glycol mono 2-ethylhexyl ether, propylene glycol mono n-butyl ether and dipropylene glycol mono n-butyl ether, is preferred.

Automobile Water-Based Paint

The automobile water-based paint of the present invention (which hereafter may be referred to as "the present paint") can contain heretofore described viscosity-regulating agent (B) and hydrophobic solvent (C) within the ranges specified in the following, per 100 mass parts of the hydroxyl-containing rein (A) in the automobile water-based paint:

viscosity-regulating agent (B): generally 0.01-20 mass parts, preferably 0.05-10 mass parts, inter alia, 0.1-5 mass parts;

hydrophobic solvent (C): generally 10-150 mass parts, preferably 15-120 mass parts, inter alia, 20-100 mass parts.

The reason why the use of the automobile water-based paint of the invention enables formation of coating film showing little metallic mottling and excelling in flip-flop property and smoothness is not precisely clear. Presumably, the use of the viscosity-regulating agent (B) having the specific structure in the water-based paint containing the hydrophobic solvent (C) gives rise to the optimum viscosity behavior for producing excellent coating film appearance.

The automobile water-based paint of the present invention preferably also contains a curing agent (D) having functional groups reactable with the hydroxyl-containing resin (A), in respect of the water resistance of resulting coating film.

As the curing agent (D), normally compounds reactable with the hydroxyl groups in the hydroxyl-containing resin (A) can be used. In particular, at least one curing agent selected from the group consisting of amino resin (D1), polyisocyanate compound (D2) and blocked polyisocyanate compound (D3), is preferred. Of these, amino resin (D1) and/or blocked polyisocyanate compound (D3), inter alia, amino resin (D1), are preferred.

Examples of the amino resin (D1) include partially or completely methylolated amino resins obtained through reaction of such amino component as melamine, urea, benzoguanamine, acetoguanamine, steroguanamine, spiroguanamine or dicyandiamide with aldehyde. As the aldehyde, for example, formaldehyde, paraformaldehyde, acetaldehyde, benzaldehyde and the like can be named, formaldehyde being particularly preferred.

Also these methylolated amino resins whose methylol groups are partially or completely etherified with suitable alcohol can be used, examples of the alcohol used for the etherification including methyl alcohol, ethyl alcohol, n-propyl alcohol, i-propyl alcohol, n-butyl alcohol, i-butyl alcohol, 2-ethylbutanol and 2-ethylhexanol.

As the amino resin (D1), melamine resins are preferred, in particular, methyl etherified melamine resins (D1-1) formed by partially or completely etherifying methylol groups in partially or completely methylolated melamine resins, with methyl alcohol; butyl etherified melamine resins (D1-2) formed by partially or completely etherifying methylol groups in partially or completely methylolated melamine resins, with butyl alcohol; and methyl-butyl mixed etherified melamine resins (D1-3) formed by partially or completely etherifying methylol groups of partially or completely methylolated melamine resins, with methyl alcohol and butyl alcohol; are preferred, the methyl-butyl mixed etherified melamine resins (D1-3) being particularly preferred.

The melamine resin preferably has a weight-average molecular weight within a range of generally 400-6,000, in particular, 1,000-5,000, more preferably, 1,200-4,000, inter alia, 1,500-3,000, from the viewpoints of flip-flop property and metallic mottling of resulting coating film.

As commercially available products of such melamine resin, for example, CYMEL 202, CYMEL 203, CYMEL 238, CYMEL 251, CYMEL 303, CYMEL 323, CYMEL 324, CYMEL 325, CYMEL 327, CYMEL 350, CYMEL 385, CYMEL 1156, CYMEL 1158, CYMEL 1116 and CYMEL 1130 (tradename, Nippon Cytec Industries, Inc.); U-VAN 120, U-VAN 20HS, U-VAN 20SE60, U-VAN 2021, U-VAN 2028 and U-VAN-28-60 (tradename, Mitsui Chemical Inc.) can be named.

Such melamine resins can be used either alone or in combination of two or more.

For the automobile water-based paint of the present invention, it is preferred to use, as the hydroxyl-containing resin (A), the earlier described hydroxyl-containing acrylic resin emulsion (A1'), and as the curing agent (B), a melamine resin having a weight-average molecular weight of generally 1,000-5,000, in particular, 1,200-4,000, inter alia, 1,500-3,000, for excellent flip-flop property and water resistance of resulting coating film.

Also when above melamine resin is used as the curing agent, a curing catalyst such as sulfonic acid such as para-toluenesulfonic acid, dodecylbenzenesulfonic acid, dinonylnaphthalenesulfonic acid and the like or salts of these acids with amines can be used.

The polyisocyanate compound (D2) is a compound normally containing at least two isocyanate groups per molecule, examples of which include aliphatic polyisocyanates such as hexamethylene diisocyanate, trimethylhexamethylene diisocyanate, dimeric acid diisocyanate and lysine diisocyanate; and biuret type adducts and isocyanurate ring adducts of these polyisocyanates; alicyclic diisocyanates such as isophorone diisocyanate, 4,4'-methylenebis(cyclohexyl isocyanate), methylcyclohexane-2,4-diisocyanate, methylcyclohexane-2,6-diisocyanate, 1,3-di(isocyanatomethyl)cyclohexane, 1,4-di(isocyanatomethyl)-cyclohexane, 1,4-cyclohexane diisocyanate, 1,3-cyclopentane diisocyanate and 1,2-cyclohexane diisocyanate; and biuret type adducts and isocyanurate ring adducts of these polyisocyanates; aromatic diisocyanate compounds such as xylylene diisocyanate, metaxylylene diisocyanate, tetramethylxylylene diisocyanate, tolylene diisocyanate, 4,4'-diphenylmethane diisocyanate, 1,5-naphthalene diisocyanate, 1,4-naphthalene diisocyanate, 4,4'-toluidine diisocyanate, 4,4'-diphenyl ether diisocyanate, m-phenylene diisocyanate, p-phenylene diisocyanate, 4,4'-biphenylene diisocyanate, 3,3'-dimethyl-4,4'-biphenylene diisocyanate, bis(4-isocyanatophenyl) -sulfone and isopropylidene-bis(4-phenyl isocyanate); and biuret type adducts and isocyanurate ring adducts of these polyisocyanates; polyisocyanates having at least three isocyanate groups per molecule, such as triphenylmethane-4,4',4''-triisocyanate, 1,3,5-triisocyanatobenzene, 2,4,6-triisocyanatotoluene and 4,4'-dimethyldiphenylmethane-2,2',5,5'-tetraisocyanate; and biuret type adducts and isocyanurate ring adducts of these polyisocyanates; urethanated adducts formed by reacting with hydroxyl groups of polyols such as ethylene glycol, propylene glycol, 1,4-butylene glycol, dimethylolpropionic acid, polyalkylene glycol, trimethylolpropane and hexanetriol, polyisocyanate compounds at a ratio to render the isocyanate groups excessive; and biuret type adducts and isocyanurate ring adducts of these polyisocyanates.

Blocked polyisocyanate compounds (D3) are usually obtained by adding a blocking agent to isocyanate groups of above polyisocyanate compounds (D2), from which the blocking agent dissociates when heated, to regenerate the isocyanate groups which can react with hydroxyl groups. The dissociation temperature of such blocking agent preferably ranges normally 60-160° C., in particular, 70-140° C.

Examples of the blocking agent include phenols such as phenol, cresol, xylenol, nitrophenol, ethylphenol, hydroxydiphenyl, butylphenol, isopropylphenol, nonylphenol, octylphenol, methyl hydroxybenzoate and the like; lactams such as ε-caprolactam, δ-valerolactam, γ-butyrolactam, β-propiolactam and the like; aliphatic alcohols such as methanol, ethanol, propyl alcohol, butyl alcohol, amyl alcohol, lauryl alcohol and the like; ethers such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxyethanol and the like; alcohols such as benzyl alcohol, glycolic acid, methyl glycolate, ethyl glycolate, butyl glycolate, lactic acid, methyl lactate, ethyl lactate, butyl lactate, methylolurea, methylolmelamine, diacetone alcohol, 2-hydroxyethyl acrylate, 2-hydroxyethyl methacrylate and the like; oximes such as formamidoxime, acetamidoxime, acetoxime, methyl ethyl ketoxime, diacetylmonooxime, benzophenone-oxime, cyclohexane-oxime and the like; active methylenes such as dimethyl malonate, diethyl malonate, ethyl acetoacetate, methyl acetoacetate, acetylacetone and the like; mercaptans such as butyl mercaptan, t-butyl mercaptan, hexyl mercaptan, t-dodecyl mercaptan, 2-mercaptobenzothiazole, thiophenol, methylthiophenol, ethylthiophenol and the like; acid amides such as acetanilide, acetanisidide, acetotoluide, acrylamide, methacrylamide, acetic acid amide, stearic acid amide, benzamide and the like; imides such as succinimide, phthalimide, maleimide and the like; amines such as diphenylamine, phenylnaphthylamine, xylidine, N-phenylxylidine, carbazole, aniline, naphthylamine, butylamine, dibutylamine, butylphenylamine and the like; imidazoles such as imidazole, 2-ethylimidazole and the like; ureas such as urea, thiourea, ethyleneurea, ethylenethiourea, diphenylurea and the like; carbamic acid esters such as phenyl N-phenylcarbamate; imines such as ethyleneimine, propyleneimine and the like; sulfurous acid salts such as sodium disulfide, potassium disulfide and the like; and azole compounds. As the azole compounds, pyrazole or pyrazole derivatives, such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, 3-methyl-5-phenylpyrazole and the like; imidazole or imidazole derivatives such as imidazole, benzimidazole, 2-methylimidazole, 2-ethylimidazole, 2-phenylimidazole and the like; and imidazoline derivatives such as 2-methylimidazoline, 2-phenylimidazoline and the like can be named.

As preferred blocking agent among these, oxime blocking agent, active methylene blocking agent, pyrazole or pyrazole derivatives are named.

As the blocking agent, also hydroxycarboxylic acid having at least one each of hydroxyl group and carboxyl group, such as hydroxypivalic acid, dimethylolpropionic acid and the like can be used. In particular, blocked polyisocyanate compound to which water dispersibility is imparted by blocking its isocyanate groups with above hydroxycarboxylic acid and thereafter neutralizing the carboxyl groups of the hydroxycarboxylic acid can be favorably used.

Where the hydroxyl-containing resin (A) contains crosslinkable functional groups such as carboxyl groups, epoxy groups or the like, compounds having functional groups reactable with those crosslinkable groups can be added as the curing agent (D). As such compounds, for example, epoxy-containing compounds, carboxyl-containing compounds, carbodiimido-containing compounds and the like can be named, among which carbodiimido-containing compounds can be conveniently used.

Examples of such carbodiimido-containing compound include polyisocyanate compound (D2) of which isocyanate groups are mutually de-carbon dioxide reacted. As commercially available carbodiimido-containing compounds, for example, CARBODILITE V-02, CARBODILITE V-02-L2, CARBODILITE V-04, CARBODILITE E-01 and CARBODILITE E-02 (tradename, Nisshinbo Industries, Inc.) can be named.

Above-named curing agents (D) can be used either alone or in combination of two or more.

Where the present paint contains the curing agent (D), it is convenient that the blend ratios are: hydroxyl-containing resin (A), generally within a range of 30-95 mass %, in particular, 50-85 mass %, inter alia, 60-80 mass %; and the curing agent (D), generally within a range of 5-70 mass %, in particular, 15-50 mass %, inter alia, 20-40 mass %; based on the total solid mass of the hydroxyl-containing resin (A) and curing agent (D).

Again, where the present paint contains the curing agent (D), it can contain the hydroxyl-containing resin (A), viscosity-regulating agent (B), hydrophobic solvent (C) and curing agent (D) within the below-specified ranges, per 100 mass parts of the total solid content of the hydroxyl-containing resin (A) and curing agent (D) in the paint:

hydroxyl-containing resin (A): generally 30-95 mass parts, preferably 50-85 mass parts, inter alia, 60-80 mass parts;

viscosity-regulating agent (B): generally 0.01-15 mass parts, preferably 0.05-8 mass parts, inter alia, 0.1-4 mass parts;

hydrophobic solvent (C): generally 5-120 mass parts, preferably 10-100 mass parts, inter alia, 15-80 mass parts;

curing agent (D): generally 5-70 mass parts, preferably 15-50 mass parts, inter alia, 20-40 mass parts.

The automobile water-based paint of the present invention can contain, besides the hydroxyl-containing resin (A), modifying resin(s) containing substantially no hydroxyl group, such as polyurethane resin, polyester resin, acrylic resin, alkyd resin, silicone resin, fluorine-containing resin, epoxy resin and the like. Of those, the paint preferably contains urethane emulsion (E) containing substantially no hydroxyl group, from the viewpoint of chipping resistance and water resistance of resulting coating film.

Examples of the urethane emulsion (E) include, for example, those prepared by the steps of making a urethane prepolymer by reacting aliphatic and/or alicyclic diisocyanate; at least one diol selected from polyetherdiol, polyesterdiol and polycarbonatediol; low molecular weight polyhydroxy compound and dimethanolalkanoic acid; neutralizing the prepolymer with tertiary amine and emulsion-dispersing it in water; thereafter mixing it with an aqueous medium which contains, where necessary, chain-extending agent such as polyamine or the like, crosslinking agent and/or suspending agent; and allowing the system to react until isocyanate group becomes substantially absent. By the above method, self-emulsifying type urethane emulsion having average particle size of normally around 0.001-3 μm can be obtained.

Where the present paint contains above urethane emulsion (E), the amount to be blended of the urethane emulsion (E) preferably is within a range of generally 3-30 mass parts, in particular, 5-20 mass parts, per 100 mass parts of the solid content of the hydroxyl-containing resin (A) in the present paint.

Those modifying resins can be used either alone or in combination of two or more. When the present paint contains such modifying resin(s), the amount of the modifying resin(s) to be blended is normally preferably 50 mass parts or less, per 100 mass parts of the solid content of the hydroxyl-containing resin (A) in the present paint.

Also when the modifying resin has crosslinkable functional groups such as carboxyl, epoxy or the like, the present paint can contain as the curing agent (D) a curing agent having crosslinkable functional groups reactable with the functional groups.

Examples of such curing agent include epoxy-containing compound, carboxyl-containing compound, carbodiimido-containing compound and the like. Of these, carbodiimido-containing compound can be conveniently used.

The automobile water-based paint of the present invention can contain effect pigment (F). Effect pigment (F) refers to the pigments which give sparkling brilliance or iridescent pattern to coating film, and those known per se can be used without limitation.

As effect pigment (F), for example, aluminum, vapor-deposited aluminum, copper, zinc, brass, nickel, aluminum oxide, mica, titanium oxide, aluminum oxide coated with iron oxide, mica coated with titanium oxide or iron oxide and the like can be named. These metallic pigments can be used either alone or in combination of two or more. As the effect pigment (F), aluminum pigment is particularly preferred. There are non-leafing type aluminum and leafing type aluminum, and both can be used as the aluminum pigment.

The effect pigment (F) is preferably flaky. Preferred size of the flakes is: the longitudinal dimension is normally within a range of around 1-100 μm, in particular, around 5-40 μm; and thickness, around 0.0001-5 μm, in particular, around 0.001-2 μm.

The effect pigment (F) can be blended within a range of generally 1-50 mass parts, preferably 5-35 mass parts, inter alia, 8-20 mass parts, per 100 mass parts of the solid content of the hydroxyl-containing resin (A) in the automobile water-based paint of the present invention.

The automobile water-based paint of the present invention can further contain, where necessary, conventional paint additives such as coloring pigment, extender, thickener, curing catalyst, dye, UV absorber, light stabilizer, defoamer, plasticizing agent, organic solvent other than the earlier described hydrophobic solvent (C), surface-regulating agent, antisettling agent and the like, either alone or in combination of two or more.

As the coloring pigment, for example, titanium dioxide, zinc flower, Carbon Black, Molybdate Red, Prussian Blue, Cobalt Blue, azo pigment, phthalocyanine pigment, quinacridone pigment, isoindoline pigment, vat pigment, perylene pigment and the like can be named, and as the extender, for example, talc, clay, kaoline, barium sulfate, barium carbonate, calcium carbonate, silica, alumina white and the like can be named.

Examples of the thickener include inorganic thickeners such as silicate, metal silicate, montmorillonite, colloidal alumina and the like; polyacrylic acid-derived thickeners such as copolymers of (meth)acrylic acid and (meth)acrylic acid ester, sodium polyacrylate (including commercialized products such as PRIMAL ASE-60, PRIMAL TT-615 and PRIMAL RM-5 of Rohm & Haas Co.; SN Thickener 613, SN-Thickener 618, SN-Thickener 630, SN Thickener 634, SN Thickener 636 of SAN NOPCO, Ltd.; all tradenames) and the like; association type thickeners having hydrophilic moiety and hydrophobic moiety within one molecule, which exhibit effective thickening action in an aqueous medium, the hydrophobic moieties adsorbing onto surfaces of the pigment or emulsion particles in the paint or mutually associating (including commercialized products such as UH-420, UH-450, UH-462, UH-472, UH-540, UH-752, UH-756VF and UH-814N of ADEKA Corporation; PRIMAL RM-8W, PRIMAL RM-825, PRIMAL RM-2020 NPR, RRIMAL RM-12W and PRIMAL SCT-275 of Rhom & Haas Co.; SN Thickener 612, SN Thickener 621N, SN Thickener 625N, SN Thickener 627N and SN Thickener 660T of SAN NOPCO, Ltd., all tradenames); cellulose derivatives thickeners such as carboxymethyl cellulose, methyl cellulose, hydroxyethyl cellulose and the like; protein thickeners such as casein, sodium caseinate, ammonium caseinate and the like; alginic acid thickeners such as sodium alginate, polyvinyl thickeners such as polyvinyl alcohol, polyvinylpyrrolidone, polyvinyl benzyl ether copolymer and the like; polyether thickeners such as pluronic polyether, polyether dialkyl ester, polyether dialkyl ether, polyether epoxy modifications and the like; maleic anhydride copolymer thickeners such as partial ester of vinyl methyl ether-maleic anhydride copolymer; and polyamide thickeners such as polyamino-amine salt and the like. These thickeners can be used either alone or in combination of two or more.

As the thickener, the polyacrylic acid thickeners and/or association type thickeners, in particular, association type thickeners, inter alia, urethane association type thickener having end-hydrophobic group(s) and containing urethane linkage in its molecular chain, are preferred. As such urethane association type thickeners, for example, UH-420, UH-462, UH-472, UH-540, UH-752, UH-756-VF and UH-814N of ADEKA Corporation; SN Thickener 612, SN Thickener 621N, SN Thickener 625N, SN Thickener 627N and SN Thickener 660T of SAN NOPCO, Ltd. (all tradenames) can be named.

Where the present paint contains a thickener as above, the amount of the thickener to be blended is suitably within a range of generally 0.01-10 mass parts, in particular, 0.05-3 mass parts, inter alia, 0.1-2 mass parts, per 100 mass parts of the solid content of the present paint.

Coating Method

The present paint is an automobile paint, its coating objects including automobiles such as cars, trucks, motorcycles, buses and the like. More specifically, the paint can be applied to outer panel portions of car bodies such as hood, fender, roof panel, door, trunk lid and the like; and car parts such as bumper, spoiler, door knob and the like.

Materials of such coating objects are not particularly limited and include, for example, metallic materials such as iron, aluminium, brass, copper, stainless steel, tin plate, zinc-plated steel, zinc alloys (Zn—Al, Zn—Ni, Zn—Fe and the like), and plated steel; plastic materials such as resins, e.g., polyethylene resin, polypropylene resin, acrylonitrile-butadiene-styrene (ABS) resin, polyamide resin, acrylic resin, vinylidene chloride resin, polycarbonate resin, polyurethane resin and epoxy resin, and various FRP's.

The surfaces of above metallic materials may be advancedly given such surface treatment as phosphate treatment, chromate treatment, complex oxide treatment or the like, and furthermore under coating film and/or intermediate coating film may be given thereon.

Coating method of the automobile water-based paint of the present invention is subject to no particular limitation and coating methods known per se, for example, air spray coating, airless spray coating, rotary atomizing coating, curtain flow coating and the like may be used. Of these, air spray coating and rotary atomizing coating are preferred. Wet coating films can be formed by these methods. These coating methods may be practiced under impression of static electricity, where necessary. The automobile water-based paint can be coated to a film thickness of normally 5-70 μm, preferably 10-60 μm, in terms of cured film thickness.

Curing of wet coating film can be effected by heating, after applying a present paint onto a coating object. Heating can be given by Per se known heating means, for example, drying oven such as hot air oven, electric oven or infrared ray induction heating oven. Suitable heating temperature normally ranges 80-180° C., preferably 100-170° C., inter alia, 120-160° C. While the heating time is not critical, it can be normally around 10-60 minutes, preferably around 20-40 minutes.

Automobile water-based paint of the present invention can be favorably used as water-based base coat paint in a coating method in which a coating object is applied with a base coat paint containing effect pigment and/or coloring pigment and then applied with a clear paint.

In the occasions of using the automobile water-based paint of the present invention as water-based base coat paint, multilayer coating film can be formed by 2-coat-1-bake system, in which an automobile water-based paint of the invention is applied onto, for example, an electrocoated and/or intermediate coated object and, without curing the formed coating film, a clear paint is applied onto the uncured coating film, followed by curing the uncured coating film and the clear coating film simultaneously by heating. The "uncured coating film" includes coating film in set-to-touch condition and dry-to-touch condition.

In case of applying an automobile water-based paint of the present invention by 2-coat-1-bake system, the paint is suitably coated to provide a cured film thickness within a range of normally 5-40 μm, preferably 10-30 μm, inter alia, 10-20 μm; and the clear paint is suitably applied to a cured film thickness within a range of 10-80 μm, in particular, 15-60 μm.

Also in the case of forming a multilayer coating film by 2-coat-1-bake system, preferably a preheating or air-blowing is given to the automobile water-based paint of the present invention after its application, under such heating condition as will not substantially cure the coating film, for preventing occurrence of defect in coating film such as foaming or cissing. The preheating temperature normally ranges 40-100° C., preferably 50-90° C., inter alia, 60-80° C. and the preheating time can range normally 30 seconds-15 minutes, preferably 1-10 minutes, inter alia, 2-5 minutes. The air blowing can be normally carried out by blowing against the coated surface of the coating object, air of ambient temperature or air heated to a temperature of 25-80° C. Furthermore, after applying the clear paint, an interval at room temperature of normally 1-60 minutes, preferably 3-20 minutes, may be taken or preheating at about 40-80° C. for 1-60 minutes may be given, where necessary.

Curing of the automobile water-based paint of the invention and the clear paint can be effected by heating means known per se as earlier described. It is suitable to simultaneously cure the two films, by heating at temperatures of normally 80-180° C., preferably 100-170° C., inter alia, 120-160° C., for around 10-60 minutes, preferably around 20-40 minutes.

It is also possible to form multilayer coating film by 3-coat-1-bake system, in which an intermediate paint is applied onto a coating object; without curing the formed coating film, an automobile water-based paint of the present invention is applied as a water-based base coat paint, onto the uncured intermediate coating film; without curing the formed coating film, a clear paint is applied onto the uncured coating film; and the three layered film of the intermediate paint, automobile water-based paint and clear paint is simultaneously cured by heating.

When a water-based paint is used as the intermediate paint in the above 3-coat-1-bake system, preferably a preheating under the conditions as will not substantially cure the coating film or air-blowing is given to the intermediate paint after its application, for preventing occurrence of defect in coating film such as foaming or cissing. The preheating temperature normally ranges 40-100° C., preferably 50-90° C., inter alia, 60-80° C. and the preheating time can range normally 30 seconds-15 minutes, preferably 1-10 minutes, inter alia, 2-5 minutes. The air-blowing can be normally carried out by blowing against the coated surface of the coating object, air of ambient temperature or air heated to a temperature of 25-80° C.

It is preferable to carry out above preheating or air-blowing after application of the automobile water-based paint of the invention. Furthermore, after applying the clear paint, an interval at room temperature of around 1-60 minutes, preferably around 3-20 minutes, may be taken or preheating at about 40-80° C. for about 1-60 minutes may be given, where necessary.

Curing of the coating film can be effected by heating means known per se as earlier described. It is suitable to simultaneously cure the three-layered film by heating at temperatures of normally 80-180° C., preferably 100-170° C., inter alia, 120-160° C., for around 10-60 minutes, preferably around 20-40 minutes.

As the intermediate paint, per se known thermosetting intermediate paint can be used. More specifically, for example, a paint comprising base resin having crosslinkable functional groups, such as alkyd resin, polyester resin, acrylic resin, urethane resin and the like; and a curing agent having functional groups reactable with the crosslinkable functional groups, such as amino resin, polyisocyanate compound, blocked polyisocyanate compound and the like; can be used. As the intermediate paint, in consideration of environmental problems and resource saving, high-solid paint, water-based paint, powder paint and the like which use little organic solvent can be favorably used.

As the clear paint, those known per se, which are customarily used for coating automobile bodies can be used. Specifically, for example, organic solvent-based thermosetting paint, water-based thermosetting paint, thermosetting powder paint, active energy ray-curable paint and the like can be named, which comprise a base resin such as acrylic resin, polyester resin, alkyd resin, urethane resin, epoxy resin, fluorine-containing resin and the like, having crosslinkable functional groups such as hydroxyl, carboxyl, epoxy, silanol or the like groups; and a curing agent such as melamine resin, urea resin, optionally blocked polyisocyanate compound, carboxyl-containing compound or resin, epoxy-containing compound or resin. Of these, thermosetting paint comprising hydroxyl-containing acrylic resin and melamine resin, thermosetting paint comprising carboxyl-containing resin and epoxy-containing resin, and thermosetting paint comprising hydroxyl-containing resin and optionally blocked polyisocyanate compound, are preferred.

The clear paint may be one-package type or may be multi-package type like two-package type urethane resin paint. It may also contain, where necessary, coloring pigment, effect pigment, dye and the like to an extent not interfering with transparency of the paint, and furthermore can suitably contain extender, curing catalyst, ultraviolet absorber, light stabilizer, defoamer, thickener, rust proofing agent, plasticizer, organic solvent, surface regulating agent, antisettling agent and the like.

EXAMPLES

Hereinafter the invention is explained more specifically, referring to working Examples and Comparative Examples, it being understood that the invention is not limited to these Examples only. "Part" and "%" are invariably by mass.

Preparation of Hydroxyl-Containing Acrylic Resin (A1)

Production Example 1

A reactor equipped with a thermometer, thermostat, stirrer, reflux condenser, nitrogen-inlet pipe and dropping device was charged with 130 parts of deionized water and 0.52 part of AQUALON KH-10 (tradename, Daiichi Kogyo Seiyaku Co., Ltd., polyoxyethylene alkyl ether sulfate ester ammonium salt, active ingredient, 97%) which were stirred and mixed in gaseous nitrogen current. The temperature was raised to 80° C., and then 1% of the total amount of a later specified monomeric emulsion (1) and 5.3 parts of 6% aqueous ammonium persulfate solution were introduced into the reactor and kept at 80° C. for 15 minutes. Then the remainder of the monomeric emulsion (1) was dropped into the reactor which was maintained at the same temperature, over 3 hours, followed by an hour's aging. Thereafter a monomeric emulsion (2) as specified later was added dropwise over an hour, aged for an hour, and the reaction mixture was cooled to 30° C. under gradual addition of 40 parts of a 5% aqueous 2-(dimethylamino)ethanol solution into the reactor. The content was discharged while being filtered through 100-mesh Nylon cloth to provide a hydroxyl-containing acrylic resin emulsion Monomeric emulsion (2): a monomeric emulsion (2) was obtained by mixing and stirring 18 parts of deionized water, 0.31 part of AQUALON KH-10, 0.03 part of ammonium persulfate, 5.1 parts of 2-hydroxyethyl acrylate, 3 parts of 2-ethylhexyl acrylate, 5.1 parts of methacrylic acid, 6 parts of methyl methacrylate, 1.8 parts of ethyl acrylate and 9 parts of n-butyl acrylate.

Production Examples 2-12

Repeating the operations of Production Example 1 except that the blends as shown in the following Table 1 were used, hydroxyl-containing acrylic resins (A1-2) to (A1-12) were obtained. Table 1 shows the solid content, acid value and hydroxyl value of each of the hydroxyl-containing acrylic resin emulsions (A1-2)-(A1-12) as obtained, concurrently with the results of Production Example 1.

TABLE 1

| Production Example | | | 1 | 2 | 3 | 4 | 5 | 6 | 7 | 8 | 9 | 10 | 11 | 12 |
|---|---|---|---|---|---|---|---|---|---|---|---|---|---|---|
| Hydroxyl-containing acrylic resin (A) | | | A1-1 | A1-2 | A1-3 | A1-4 | A1-5 | A1-6 | A1-7 | A1-8 | A1-9 | A1-10 | A1-11 | A1-12 |
| Deionized water | | | | | | | | | 130 | | | | | |
| AQUALON KH-10 | | | | | | | | | 0.52 | | | | | |
| 6% Aqueous ammonium persulfate solution | | | | | | | | | 5.3 | | | | | |
| Monomeric emulsion (1) | deionized water | | | | | | | | 42 | | | | | |
| | AQUALON KH-10 | | | | | | | | 0.72 | | | | | |
| | Monomer (a1-2) | methylenebis-acrylamide | | | 2.1 | 2.1 | 2.1 | 2.1 | 2.1 | 1.5 | 1.5 | 1.5 | | |
| | | allyl methacrylate | 2.1 | 2.1 | | | | | | 2.3 | 2.3 | | | 2.1 |
| | Monomer (a1-3) | acrylamide | | | | | | | | | | | 2.1 | |
| | | styrene | 2.8 | 2.8 | 2.8 | 2.8 | 2.8 | 2.8 | 2.8 | 5.3 | 5.3 | 6.8 | 2.8 | 2.8 |
| | | methyl methacrylate | 16.1 | 16.1 | 16.1 | 16.1 | 16.1 | 16.1 | 16.1 | 44 | 44 | 18 | 16.1 | 16.1 |
| | | ethyl acrylate | 28 | 28 | 28 | 28 | 28 | 28 | 28 | 11.3 | 11.3 | 26 | 28 | 28 |
| | | n-butyl acrylate | 21 | 21 | 21 | 21 | 21 | 21 | 21 | 10 | 10 | 22.5 | 21 | 21 |
| Monomer emulsion (2) | deionized water | | | | | | | | 18 | | | | | |
| | AQUALON KH-10 | | | | | | | | 0.31 | | | | | |
| | ammonium persulfate | | | | | | | | 0.03 | | | | | |
| | monomer (a1-1) | 2-hydroxyethyl acrylate | 5.1 | 5.1 | 3 | 5.1 | 10.2 | 5.1 | 5.1 | 2.2 | 2.3 | 2 | 5.1 | 5.1 |
| | monomer (a1-4) | styrene | | 3 | 3 | 3 | 3 | 3 | 3 | 3 | 3 | 2.2 | | |
| | | 2-ethylhexyl acrylate | 3 | | 3.3 | | | | | | 6 | | 3 | |
| | Monomer (a1-5) | Monomer (a1-6) | methacrylic acid | 5.1 | 5.1 | 3 | 5.1 | 5.1 | 9 | 5.1 | 2.4 | 3.3 | 4.2 | 5.1 | 5..1 |
| | | methyl methacrylate | 6 | 6 | 6 | 6 | 6 | 6 | 6 | 6 | 5 | 4.8 | 6 | 9 |
| | | ethyl acrylate | 1.8 | 1.8 | 2.7 | 1.8 | 1.8 | 1.8 | 1.8 | | | 6.8 | 1.8 | 1.8 |
| | | n-butyl acrylate | 9 | 9 | 9 | 9 | 3.9 | 5.1 | 8 | 12 | 6 | 5 | 9 | 9 |
| | | allyl methacrylate | | | | | | | 1 | | | | | |
| 5% Aqueous 2-(dimethylamino)ethanol solution | | | | | | | | | 40 | | | | | |
| Solid content (mass %) | | | | | | | | | 30 | | | | | |
| Acid value (mgKOH/g) | | | 33 | 33 | 20 | 33 | 33 | 59 | 33 | 16 | 22 | 27 | 33 | 33 |
| Hydroxyl value (mgKOH/g) | | | 25 | 25 | 15 | 25 | 49 | 25 | 25 | 11 | 11 | 10 | 25 | 25 |

(A1-1) having an average particle size of 100 nm [as measured with a submicron particle size distribution measuring device, COULTER N4 Model (tradename, Beckman Coulter, Inc.), as to a sample diluted with deionized water at 20° C.] and solid content of 30%. Thus obtained hydroxyl-containing acrylic resin had an acid value of 33 mgKOH/g and hydroxyl value of 25 mgKOH/g.

Monomeric emulsion (1): a monomeric emulsion (1) was obtained by mixing and stirring 42 parts of deionized water, 0.72 part of AQUALON KH-10, 2.1 parts of allyl methacrylate, 28 parts of styrene, 16.1 parts of methyl methacrylate, 28 parts of ethyl acrylate and 21 parts of n-butyl acrylate Among those hydroxyl-containing acrylic resin emulsions (A1-1)-(A1-12), (A1-1) to (A1-10) correspond to the hydroxyl-containing acrylic resin emulsion (A1') in the present invention.

Production Example 13

A reactor equipped with a thermometer, thermostat, stirrer, reflux condenser, nitrogen-inlet pipe and dropping device was charged with 35 parts of propylene glycol monopropyl ether. After raising its temperature to 85° C., a mixture of 30 parts of methyl methacrylate, 20 parts of 2-ethylhexyl acrylate, 29 parts of n-butyl acrylate, 15 parts of 2-hydroxyethyl acrylate, 6 parts of acrylic acid, 15 parts of propylene glycol monopropyl ether and 2.3 parts of 2,2'-azobis(2,4-dimethylvaleronitrile was added dropwise over 4 hours, followed by an hour's aging. Thereafter further a mixture of 10 parts of propylene glycol monopropyl ether and 1 part of 2,2'-azobis(2,4-dimethylvaleronitrile) was added dropwise over an hour, followed by an hour's aging. Further adding 7.4 parts of diethanolamine, a hydroxyl-containing acrylic resin solution (A1-13) having a solid content of 55%, weight-average molecular weight of 58,000, acid value of 47 mgKOH/g and hydroxyl value of 72 mgKOH/g was obtained.

Preparation of Hydroxyl-Containing Polyester Resin (A2)

Production Example 14

A reactor equipped with a thermometer, thermostat, stirrer, reflux condenser and water-separator was charged with 109 parts of trimethylolpropane, 141 parts of 1,6-hexanediol, 126 parts of hexahydrophthalic anhydride and 120 parts of adipic acid, and the temperature therein was raised from 160° C. to 230° C. over 3 hours, followed by 4 hours' condensation reaction at 230° C. Then further 38.3 parts of trimellitic anhydride was added to the resulting condensation reaction product to add carboxyl groups thereto, reacted at 170° C. for 30 minutes and diluted with 2-ethyl-1-hexanol (whose soluble mass in 100 g of water at 20° C.: 0.1 g) to provide a hydroxyl-containing polyester resin solution (PE1) having an acid value of 46 mgKOH/g, hydroxyl value of 150 mgKOH/g, solid content of 70% and weight-average molecular weight of 1,400.

Production Example 15

Production Example 14 was repeated except that the diluting solvent, 2-ethyl-1-hexanol, was replaced by ethylene glycol mono 2-ethylhexyl ether (whose soluble mass in 100 g of water at 20° C.: 0.5 g), to provide a polyester resin solution (PE2).

Production Example 16

Production Example 14 was repeated except that the diluting solvent, 2-ethyl-1-hexanol, was replaced by dipropylene glycol mono n-propyl ether (whose soluble mass in 100 g of water at 20° C.: 19 g), to provide a polyester resin solution (PE3).

Production Example 17

Production Example 14 was repeated except that the diluting solvent, 2-ethyl-1-hexanol, was replaced by ethylene glycol monobutyl ether (whose soluble mass in 100 g of water at 20° C.: unlimited), to provide a polyester resin solution (PE4).

Preparation of Viscosity-Regulating Agent

Production Example 18

A monomeric mixture of 20 parts of methacrylic acid, 19.5 parts of an acrylate of n-octadecyl alcohol-ethylene oxide (60 mols) adduct, 60 parts of propyl acrylate and 0.5 part of diacrylate of ethylene glycol-ethylene oxide (15 mols) adduct, and 50 parts of 1% methyl triglycol solution of 2,2'-azobisisobutyronitrile were separately added dropwise to 350 parts of methyl triglycol, each through a dropping funnel at a uniform rate over 1.5 hours, under uniform stirring to cause their reaction. The reaction temperature was maintained at 80-90° C. After termination of the dropping, the system was maintained at the same temperature for 3 hours, and cooled to 40° C. to provide a viscosity-regulating agent (B-1) (the copolymer concentration: 20%).

Production Example 19

A monomeric mixture of 45 parts of methacrylic acid, 44.7 parts of acrylate of n-octadecyl alcohol-propylene oxide (10 mols)-ethylene oxide (40 mols) adduct (random copolymerization), 10 parts of ethyl methacrylate and 0.3 part of dimethacrylate of ethylene glycol-ethylene oxide (15 mols) adduct, and 50 parts of 0.5% butyl glycol solution of 2,2'-azobisisobutyronitrile were separately added dropwise to 350 parts of butyl glycol, each through a dropping funnel at a uniform rate over 1.5 hours, under uniform stirring to cause their reaction. The reaction temperature was maintained at 80-90° C. After termination of the dropping, the system was maintained at the same temperature for 3 hours, and cooled to 40° C. to provide a viscosity-regulating agent (B-2) (the copolymer concentration: 20%).

Production Example 20

A monomeric mixture of 16.4 parts of methacrylic acid, 40 parts of methacrylate of isooctadecyl alcohol-ethylene oxide (30 mols)-propylene oxide (10 mols) adduct (random copolymerization), 13.5 parts of ethyl methacrylate, 1.5 parts of triacrylate of glycerin-ethylene oxide (90 mols) adduct and 28.6 parts of methacrylamide, and 50 parts of 1% butyl glycol solution of 2,2'-azobisisobutyronitrile were separately added dropwise to 350 parts of butyl glycol, each through a dropping funnel at a uniform rate over 1.5 hours, under uniform stirring to cause their reaction. The reaction temperature was maintained at 80-90° C. After termination of the dropping, the system was maintained at the same temperature for 3 hours, and cooled to 40° C. to provide a viscosity-regulating agent (B-3) (the copolymer concentration: 20%).

Production Example 21

To a mixture of 1,100 parts of water, 169.9 parts of methacrylic acid, 44.6 parts of acrylate of methyl alcohol-ethylene oxide (90 mols) adduct, 58.5 parts of ethyl methacrylate, 5.6 parts of dodecyl acrylate and 21.2 parts of polyoxyethylene (=ethylene oxide 25 mols adduct)-stearyl ether sulfate sodium salt, 100 parts of 0.2% aqueous potassium persulfate solution was added dropwise at a uniform rate under stirring over 3 hours to cause their reaction. The reaction temperature was maintained at 80-90° C. After termination of the dropping, the system was maintained at the same temperature for 3 hours, and cooled to 40° C. to provide a viscosity-regulating agent (B-4) (the copolymer concentration: 20%).

Production Example 22

To a mixture of 1,100 parts of water, 111 parts of methacrylic acid, 28 parts of ethyl acrylate, 28 parts of acrylamide, 28 parts of methacrylate of dodecyl alcohol-ethylene oxide (40 mols) adduct, 83 parts of styrene, 10 parts of polyoxyethylene (=ethylene oxide 8 mols adduct)-lauryl ether phosphoric acid diester sodium salt and 12 parts of polyoxyethylene (=ethylene oxide 20 mols adduct)-lauryl ether, 100 parts of 0.2% aqueous potassium persulfate solution was added dropwise at a uniform rate under stirring over 3 hours to cause their reaction. The reaction temperature was maintained at 80-90° C. After termination of the dropping, the system was maintained at the same temperature for 3 hours, and cooled to 40° C. to provide a viscosity-regulating agent (B-5) (the copolymer concentration: 20%).

Production Example of Effect Pigment Concentrate

Production Example 23

In an agitation mixing vessel, 35 parts of 2-ethyl-1-hexanol was placed and uniformly mixed with 19 parts of aluminium pigment paste, GX-180A (tradename, Asahikasei Metals Co., Ltd., metal content 74%), 8 parts of a phosphoric acid group-containing resin solution (note 1) and 0.2 part of 2-(dimethylamino)ethanol to provide an effect pigment concentrate (P1).

(note 1) phosphoric acid group-containing resin solution: A reactor equipped with a thermometer, thermostat, stirrer, reflux condenser, nitrogen-inlet pipe and dropping device was charged with mixed solvent of 27.5 parts of methoxypropanol and 27.5 parts of isobutanol. After heating the same to 110° C., 121.5 parts of a mixture of 25 parts of styrene, 27.5 parts of n-butyl methacrylate, 20 parts of Isostearyl Acrylate (tradename, Osaka Organic Chemical Industry Ltd., a branched higher alkyl acrylate), 7.5 parts of 4-hydroxybutyl acrylate, 15 parts of a phosphoric acid group-containing polymerizable monomer (note 2), 12.5 parts of 2-methacryloyloxyethyl acid phosphate, 10 parts of isobutanol and 4 parts of t-butyl peroxyoctanoate was added to the mixed solvent over 4 hours. Further a mixture of 0.5 part of t-butyl peroxyoctanoate and 20 parts of isopropanol was added dropwise over an hour. Aging the reaction mixture for an hour under stirring, a phosphoric acid group-containing resin solution having a solid content of 50% was obtained. The acid value of this resin attributable to the phosphoric acid group was 83 mgKOH/g, hydroxyl value was 29 mgKOH/g, and the weight-average molecular weight was 10,000.

(note 2) Phosphoric acid group-containing polymerizable monomer: A reactor equipped with a thermometer, thermostat, stirrer, reflux condenser, nitrogen-inlet pipe and dropping device was charged with 57.5 parts of monobutylphosphoric acid and 41 parts of isobutanol, which were heated to 90° C. Then 42.5 parts of glycidyl methacrylate was added dropwise over 2 hours, followed by an hour's aging under stirring. Adding 59 parts of isopropanol, a phosphoric acid group-containing polymerizable monomer solution having a solid content of 50% was obtained. The acid value of thus obtained monomer attributable to the phosphoric acid group was 285 mgKOH/g.

Production Example 24

Production Example 23 was repeated except that the 35 parts of 2-ethyl-1-hexanol was replaced by 35 parts of ethylene glycol mono 2-ethylhexyl ether, to provide an effect pigment concentrate (P2).

Production Example 25

Production Example 23 was repeated except that the 35 parts of 2-ethyl-1-hexanol was replaced by 35 parts of dipropylene glycol mono n-propyl ether, to provide an effect pigment concentrate (P3).

Production Example 26

Production Example 23 was repeated except that the 35 parts of 2-ethyl-1-hexanol was replaced by 35 parts of ethylene glycol monobutyl ether, to provide an effect pigment concentrate (P4).

Examples of Automobile Water-Based Paint

Example 1

One-hundred (100) parts of the hydroxyl-containing acrylic resin emulsion (A1-1) as obtained in Production Example 1, 57 parts of the polyester resin solution (PE1) as obtained in Production Example 14, 62 parts of the effect pigment concentrate (P1) as obtained in Production Example 23, 38 parts of a methyl-butyl mixed-etherified melamine resin (D1-3-1) (solid content, 80%; weight-average molecular weight, 1,400) and 3 parts of the viscosity-regulating agent (B-1) as obtained in Production Example 18 (solid content, 0.6 part) were homogeneously mixed. Further deionized water and 2-(dimethylamino)ethanol were added to provide an automobile water-based paint (X1) of pH 8.0, having a viscosity of 40 seconds as measured with Ford cup No. 4 at 20° C.

Examples 2-22 and Comparative Examples 1-5

Example 1 was repeated except that the blended composition was changed in each run as shown in the following Table 2, to provide automobile water-based paints (X2)-(X27) of pH 8.0 each having a viscosity of 40 seconds as measured with Ford cup No. 4.

TABLE 2

| | | | Example | | | | | | | | | | | | | | |
|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 |
| Automobile water-based paint | | | X1 | X2 | X3 | X4 | X5 | X6 | X7 | X8 | X9 | X10 | X11 | X12 | X13 | X14 |
| Hydroxyl-containing resin (A) | hydroxyl-containing acrylic resin (A1) | A1-1 | 100 | | | | | | | | | | | | | |
| | | A1-2 | | 100 | | | | | | | | | | | | |
| | | A1-3 | | | 100 | | | | | | | | | | | |
| | | A1-4 | | | | 100 | | | | | | | | | 100 | 233 |
| | | A1-5 | | | | | 100 | | | | | | | | | |
| | | A1-6 | | | | | | 100 | | | | | | | | |
| | | A1-7 | | | | | | | 100 | | | | | | | |
| | | A1-8 | | | | | | | | 100 | | | | | | |
| | | A1-9 | | | | | | | | | 100 | | | | | |
| | | A1-10 | | | | | | | | | | 100 | | | | |
| | | A1-11 | | | | | | | | | | | 100 | | | |
| | | A1-12 | | | | | | | | | | | | 100 | | |
| | | A1-13 | | | | | | | | 18 | 18 | 18 | | | 36 | |

TABLE 2-continued

|  |  |  | Ex1 | Ex2 | Ex3 | Ex4 | Ex5 | Ex6 | Ex7 | Ex8 | Ex9 | Ex10 | Ex11 | Ex12 | Ex13 | Ex14 |
|---|---|---|---|---|---|---|---|---|---|---|---|---|---|---|---|---|
| Hydroxyl-containing resin (A) | hydroxyl-containing polyester resin (A2) | A2-1 | 57 | 57 | 57 | 57 | 57 | 57 | 57 | 43 | 43 | 43 | 57 | 57 | 29 |  |
|  |  | A2-2 |  |  |  |  |  |  |  |  |  |  |  |  |  |  |
|  |  | A2-3 |  |  |  |  |  |  |  |  |  |  |  |  |  |  |
|  |  | A2-4 |  |  |  |  |  |  |  |  |  |  |  |  |  |  |
| Viscosity-regulating agent (B) |  | B-1 | 3 | 3 | 3 | 3 | 3 | 3 | 3 | 3 | 3 | 3 | 3 | 3 | 3 | 3 |
|  |  | B-2 |  |  |  |  |  |  |  |  |  |  |  |  |  |  |
|  |  | B-3 |  |  |  |  |  |  |  |  |  |  |  |  |  |  |
|  |  | B-4 |  |  |  |  |  |  |  |  |  |  |  |  |  |  |
|  |  | B-5 |  |  |  |  |  |  |  |  |  |  |  |  |  |  |
| Curing agent (D) | methyl-etherified melamine resin (D1-1) | D1-1-1 (note 3) |  |  |  |  |  |  |  |  |  |  |  |  |  |  |
|  | methyl-butyl mixed-etherified melamine resin (D1-3) | D1-3-1 | 38 | 38 | 38 | 38 | 38 | 38 | 38 | 38 | 38 | 38 | 38 | 38 | 38 | 38 |
|  |  | D1-3-2 (note 4) |  |  |  |  |  |  |  |  |  |  |  |  |  |  |
| Urethane emulsion (E) |  | UX-8100 (note 5) |  |  |  |  |  |  |  |  |  |  |  |  |  |  |
| Effect pigment concentrate |  | P1 | 62 | 62 | 62 | 62 | 62 | 62 | 62 | 62 | 62 | 62 | 62 | 62 | 62 | 62 |
|  |  | P2 |  |  |  |  |  |  |  |  |  |  |  |  |  |  |
|  |  | P3 |  |  |  |  |  |  |  |  |  |  |  |  |  |  |
|  |  | P4 |  |  |  |  |  |  |  |  |  |  |  |  |  |  |

|  |  |  | Example |  |  |  |  |  |  |  | Comparative Example |  |  |  |  |
|---|---|---|---|---|---|---|---|---|---|---|---|---|---|---|---|
|  |  |  | 15 | 16 | 17 | 18 | 19 | 20 | 21 | 22 | 1 | 2 | 3 | 4 | 5 |
| Automobile water-based paint |  |  | X15 | X16 | X17 | X18 | X19 | X20 | X21 | X22 | X23 | X24 | X25 | X26 | X27 |
| Hydroxyl-containing resin (A) | hydroxyl-containing acrylic resin (A1) | A1-1 |  |  |  |  |  |  |  |  |  |  |  |  |  |
|  |  | A1-2 |  |  |  |  |  |  |  |  |  |  |  |  |  |
|  |  | A1-3 |  |  |  |  |  |  |  |  | 100 | 100 | 100 | 100 | 100 |
|  |  | A1-4 |  |  |  |  |  |  |  |  |  |  |  |  |  |
|  |  | A1-5 | 100 | 100 |  |  |  |  |  | 100 |  |  |  |  |  |
|  |  | A1-6 |  |  |  |  |  |  |  |  |  |  |  |  |  |
|  |  | A1-7 |  |  |  |  |  |  |  |  |  |  |  |  |  |
|  |  | A1-8 |  |  |  | 100 |  |  |  |  |  |  |  |  |  |
|  |  | A1-9 |  |  |  |  |  |  |  |  |  |  |  |  |  |
|  |  | A1-10 |  |  | 100 |  | 100 | 100 | 100 |  |  |  |  |  |  |
|  |  | A1-11 |  |  |  |  |  |  |  |  |  |  |  |  |  |
|  |  | A1-12 |  |  |  |  |  |  |  |  |  |  |  |  |  |
|  |  | A1-13 |  |  |  | 18 | 18 | 18 | 18 |  |  |  |  |  |  |
|  | hydroxyl-containing polyester resin (A2) | A2-1 | 57 |  |  | 43 | 43 | 29 | 43 |  | 57 | 57 | 57 | 57 |  |
|  |  | A2-2 |  | 57 |  |  |  |  |  | 57 |  |  |  |  |  |
|  |  | A2-3 |  |  |  |  |  |  |  |  |  |  |  | 57 |  |
|  |  | A2-4 |  |  |  |  |  |  |  |  |  |  |  |  | 57 |
| Viscosity-regulating agent (B) |  | B-1 |  |  | 3 | 3 | 3 |  |  | 3 | 3 |  |  | 3 | 3 |
|  |  | B-2 | 3 |  |  |  | 2.4 |  |  |  |  |  |  |  |  |
|  |  | B-3 |  |  |  |  |  | 3.3 |  |  |  |  |  |  |  |
|  |  | B-4 |  |  |  |  |  |  |  |  |  | 3 |  |  |  |
|  |  | B-5 |  |  |  |  |  |  |  |  |  |  | 3 |  |  |
| Curing agent (D) | methyl-etherified melamine resin (D1-1) | D1-1-1 (note 3) |  |  |  |  |  |  |  | 38 |  |  |  |  |  |
|  | methyl-butyl mixed-etherified melamine resin (D1-3) | D1-3-1 | 38 | 38 |  |  |  |  |  |  | 38 | 38 | 38 | 38 | 38 |
|  |  | D1-3-2 (note 4) |  |  | 50 | 50 | 50 | 50 | 50 |  |  |  |  |  |  |
| Urethane emulsion (E) |  | UX-8100 (note 5) |  |  |  |  | 28 |  |  |  |  |  |  |  |  |
| Effect pigment concentrate |  | P1 | 62 |  | 62 | 62 | 62 | 62 |  | 62 | 62 | 62 | 62 |  |  |
|  |  | P2 |  | 62 |  |  |  |  | 62 |  |  |  |  |  |  |
|  |  | P3 |  |  |  |  |  |  |  |  |  |  |  | 62 |  |
|  |  | P4 |  |  |  |  |  |  |  |  |  |  |  |  | 62 |

(note 3) Melamine resin (D1-1-1): a methyl-etherified melamine resin; solid content, 80%; weight-average molecular weight, 800

(note 4) Melamine resin (D1-3-2): methyl-butyl mixed-etherified melamine resin; solid content, 60%; weight-average molecular weight, 2,000

(note 5) UCOAT UX-8100: tradename, Sanyo Chemical Industries, Ltd., a urethane emulsion, solid content, 35%

Coating Film-Forming Method (Preparation of Test Panels)

Using those automobile water-based paints (X1)-(X27) as obtained in the above Examples 1-22 and Comparative Examples 1-5, respective test panels were prepared as follows, to subject them to evaluation tests.

(Preparation of Test Coating Object)

A zinc phosphate-treated cold-rolled steel sheet was electrocoated with ELECRON GT-10 (tradename, Kansai Paint Co., a cationic electrocoating paint) to a cured film thickness of 20 μm, which was cured by heating at 170° C. for 30 minutes. Onto the electrocoated film, an intermediate paint, AMILAC TP-65-2 (tradename, Kansai Paint Co., a polyester resin-amino resin-containing organic solvent-based intermediate paint) was applied to a cured film thickness of 40 μm, and cured by heating at 140° C. for 30 minutes, to provide the test coating object.

Example 23

Onto the above test coating object, the automobile water-based paint (X1) as obtained in Example 1 was applied with a rotary atomizing type electrostatic coater to a cured film thickness of 15 μm, allowed to stand for 2 minutes and then preheated at 80° C. for 3 minutes. Then onto the uncured coated surface, MAGICRON KINO-1210 (tradename, Kansai Paint Co., an acrylic resin-containing, organic solvent-based top clear paint which may be hereafter referred to as "clear paint (Z-1)") was electrostatically applied to a cured film thickness of 40 μm and allowed to stand for 7 minutes, followed by heating at 140° C. for 30 minutes to cure the two coating films simultaneously to provide a test panel.

Examples 24-44 and Comparative Examples 6-10

Example 23 was repeated except that the automobile water-based paint (X1) in Example 23 was replaced with those automobile water-based paints as shown in the following Table 3, to provide the test panels for Examples 24-44 and Comparative Examples 6-10.
Evaluation Test
The test panels as obtained in above Examples 23-44 and Comparative Examples 6-10 were evaluated by the following test methods. The results of the evaluation were as shown in the following Table 3.
(Test Method)
Flip-Flop Property:
Each of the test panels was visually observed at different angles and its flip-flop property was evaluated according to the following standard.
⊙: Color tone change depending on the visual observation angles was very great, exhibiting excellent flip-flop property.
○: Color tone change depending on the visual observation angles was great, exhibiting good flip-flop property.
Δ: Color tone change depending on the visual observation angles was less great, exhibiting rather inferior flip-flop property.
X: Color tone change depending on the visual observation angles was a small, exhibiting inferior flip-flop property.
Metallic Mottling:
Each of the test panels was visually observed and metallic mottling was evaluated according to the following standard.
⊙: No metallic mottling was observed.
○: Little metallic mottling was observed.
Δ: Minor metallic mottling was observed.
X: Much metallic mottling was observed.
Smoothness:
Appearance of the test panels was visually evaluated.
⊙: Smoothness was excellent.
○: Smoothness was good.
Δ: Smoothness was rather inferior.
X: Smoothness was inferior.
Distinctness of Image:
Using an distinctness of image measuring device, PGD-IV Model (tradename, sales agent, Japan Color Research Institute), PGD value of each coating film was measured, at a fixed angle of 55°. Higher values signify better distinctness of image.
Water Resistance:
Water resistance: The test panels were immersed in 40° C. warm water for 240 hours, withdrawn and dried at 20° C. for 12 hours. The multilayer coating film on each test panel was crosscut with a cutter to the depth reaching the substrate, to form one-hundred 2 mm×2 mm squares. Then an adhesive cellophane tape was stuck thereon, and rapidly peeled off at 20° C. The remaining condition of the crosscut coating film was examined. Water-resistant adherability was evaluated according to the following standard.
⊙: One-hundred squares of the coating film remained, and no minor chipping off at the cut-in edges was caused.
○: One-hundred squares of the coating film remained but minor chipping off at the cut-in edges was observed.
Δ: Remaining number of the squares was 90-99.
X: Remaining number of the square was not more than 89.

TABLE 3

| | | Automobile Water-based Paint | Result of Evaluation | | | | |
|---|---|---|---|---|---|---|---|
| | | | Flip-flop property | Metallic mottling | Smoothness | distinctness of image | Water resistance |
| Example | 23 | X1 | ○ | ○ | ○ | 0.8 | ○ |
| | 24 | X2 | ○ | ○ | ○ | 0.9 | ○ |
| | 25 | X3 | ⊙ | ○ | ○ | 0.9 | ○ |
| | 26 | X4 | ⊙ | ⊙ | ⊙ | 0.9 | ○ |
| | 27 | X5 | ○ | ⊙ | ○ | 0.9 | ○ |
| | 28 | X6 | ○ | ⊙ | ○ | 0.9 | ○ |
| | 29 | X7 | ○ | ○ | ○ | 0.9 | ○ |
| | 30 | X8 | ⊙ | ⊙ | ⊙ | 0.9 | ○ |
| | 31 | X9 | ⊙ | ⊙ | ○ | 0.9 | ○ |
| | 32 | X10 | ⊙ | ⊙ | ⊙ | 0.9 | ○ |
| | 33 | X11 | ○ | ○ | ○ | 0.7 | ○ |
| | 34 | X12 | ○ | ○ | ○ | 0.7 | ○ |
| | 35 | X13 | ⊙ | ⊙ | ⊙ | 0.9 | ○ |
| | 36 | X14 | ⊙ | ⊙ | ○ | 0.8 | ○ |
| | 37 | X15 | ⊙ | ○ | ○ | 0.9 | ○ |
| | 38 | X16 | ⊙ | ⊙ | ○ | 0.9 | ○ |
| | 39 | X17 | ⊙ | ⊙ | ⊙ | 1.0 | ⊙ |
| | 40 | X18 | ⊙ | ⊙ | ⊙ | 1.0 | ⊙ |
| | 41 | X19 | ⊙ | ○ | ○ | 1.0 | ⊙ |
| | 42 | X20 | ⊙ | ⊙ | ○ | 1.0 | ⊙ |
| | 43 | X21 | ⊙ | ⊙ | ○ | 1.0 | ⊙ |
| | 44 | X22 | ○ | ○ | ○ | 0.8 | ○ |

TABLE 3-continued

|  | Automobile Water-based Paint | Result of Evaluation | | | | |
|---|---|---|---|---|---|---|
|  |  | Flip-flop property | Metallic mottling | Smoothness | distinctness of image | Water resistance |
| Comparative Example | 6 X23 | X | X | X | 0.6 | ○ |
|  | 7 X24 | Δ | X | Δ | 0.6 | ○ |
|  | 8 X25 | Δ | X | Δ | 0.6 | ○ |
|  | 9 X26 | X | X | Δ | 0.6 | ○ |
|  | 10 X27 | X | X | Δ | 0.6 | ○ |

The invention claimed is:

1. An automobile water-based paint which comprises hydroxyl-containing resin (A), viscosity-regulating agent (B) and hydrophobic solvent (C), characterized in that the viscosity-regulating agent (B) is a copolymer obtained by copolymerizing a mixture of polymerizable unsaturated monomers comprising 1-50 mass % of (meth)acrylic acid (salt) (b-1), 5-60 mass % of polymerizable unsaturated monomer (b-2) represented by the following general formula (1):

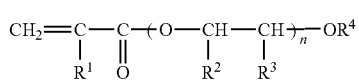

in which
R$^1$ stands for hydrogen or methyl,
R$^2$ and R$^3$ stand for hydrogen, methyl or ethyl,
R$^4$ stands for C$_{8-24}$ hydrocarbon group, and
n is an integer of 3-60,
5-60 mass % of alkyl (meth)acrylate (b-3) of which alkyl moiety has 1-4 carbons, and 0.05-5 mass % of polymerizable unsaturated monomer (b-4) having at least two polymerizable unsaturated groups per molecule, based on the combined mass of the polymerizable unsaturated monomers (b-1)-(b-4).

2. An automobile water-based paint according to claim 1, in which the hydroxyl-containing resin (A) is at least one resin selected from the group consisting of hydroxyl-containing acrylic resin (A1) and hydroxyl-containing polyester resin (A2).

3. An automobile water-based paint according to claim 2, in which the hydroxyl-containing acrylic resin (A1) is a hydroxyl-containing acrylic resin emulsion (A1') having a core/shell type multilayer structure composed of the core of copolymer (I) obtained by copolymerization of 0.1-30 mass % of polymerizable unsaturated monomer (a1-2) having at least two polymerizable unsaturated groups per molecule with 70-99.9 mass % of polymerizable unsaturated monomer (a1-3) having one polymerizable unsaturated group per molecule, and the shell of copolymer (II) obtained by copolymerization of 1-40 mass % of hydroxyl-containing polymerizable unsaturated monomer (a1-1),-5-50 mass % of hydrophobic polymerizable unsaturated monomer (a1-4) and 10-94 mass % of polymerizable unsaturated monomer (a1-5) other than above hydroxyl-containing polymerizable unsaturated monomer (a1-1) and hydrophobic polymerizable unsaturated monomer (a1-4), the solid mass ratio of the copolymer (I)/copolymer (II) being within a range of 10/90-90/10.

4. An automobile water-based paint according to claim 3, in which the polymerizable unsaturated monomer (a1-2) having at least two polymerizable unsaturated groups per molecule contains amido group.

5. An automobile water-based paint according to claim 1, in which the polymerizable unsaturated monomer (b-4) having at least two polymerizable unsaturated groups per molecule is at least one polymerizable unsaturated monomer selected from the group consisting of polyoxyalkylene glycol di(meth)acrylate, tri(meth)acrylate of glycerin-alkylene oxide adduct, tri(meth)acrylate of trimethylolpropane-alkylene oxide adduct and tri(meth)acrylate of pentaerythritol-alkylene oxide adduct.

6. An automobile water-based paint according to claim 1, in which the hydrophobic solvent (C) is an alcoholic hydrophobic solvent.

7. An automobile water-based paint according to claim 1, which contains, per 100 mass parts of the solid content of the hydroxyl-containing resin (A), the viscosity regulating agent (B) within a range of 0.01-20 mass parts, and the hydrophobic solvent (C), within a range of 10-150 mass parts.

8. An automobile water-based paint according to claim 1, which further contains a curing agent (D).

9. An automobile water-based paint according to claim 8, in which the curing agent (D) is a melamine resin having a weight-average molecular weight within a range of 1,000-5.000.

10. An automobile water-based paint according to claim 8, which contains, per 100 mass parts of the total solid content of the hydroxyl-containing resin (A) and curing agent (D), within a range of 30-95 mass parts of the hydroxyl-containing resin (A), 0.01-15 mass parts of the viscosity-regulating agent (B), 5-120 mass parts of the hydrophobic solvent (C) and 5-70 mass parts of the curing agent (D).

11. An automobile water-based paint according to claim 1, which further contains effect pigment (F).

12. Articles coated with the automobile water-based paint as described in any one of claims 1-11.

13. A multilayer coating film-forming method comprising applying an automobile water-based paint as described in any one of claims 1-11 onto a coating object, applying onto the resulting uncured coating film a clear paint, and thereafter curing both of the coating films simultaneously by heating.

14. Articles coated by the multilayer coating film-forming method as described in claim 13.

* * * * *